United States Patent
Kang et al.

(10) Patent No.: US 11,349,967 B2
(45) Date of Patent: May 31, 2022

(54) APPARATUS AND METHOD FOR FAST COMMUNICATION BETWEEN MASTER AND SLAVE

(71) Applicant: Samsung Electronics Co., Ltd., Suwon-si (KR)

(72) Inventors: Namyong Kang, Suwon-si (KR); Chunho Park, Suwon-si (KR); Hyungseoung Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/935,599

(22) Filed: Jul. 22, 2020

(65) Prior Publication Data

US 2021/0044680 A1 Feb. 11, 2021

(30) Foreign Application Priority Data

Aug. 7, 2019 (KR) .................. 10-2019-0096404

(51) Int. Cl.
*H04L 69/24* (2022.01)
*H04W 76/14* (2018.01)
(Continued)

(52) U.S. Cl.
CPC ............. *H04L 69/24* (2013.01); *H04W 4/80* (2018.02); *H04W 76/14* (2018.02); *H04W 84/20* (2013.01)

(58) Field of Classification Search
CPC .................................................. H04W 76/23
See application file for complete search history.

(56) References Cited

U.S. PATENT DOCUMENTS 9,351,330 B2 5/2016 Weizman et al.
9,743,449 B2 8/2017 Linsky et al.
(Continued)

FOREIGN PATENT DOCUMENTS

JP 2017-118405 A 6/2017
KR 10-2020-0017302 A 2/2020

OTHER PUBLICATIONS

International Search Report dated Oct. 26, 2020, issued in International Patent Application No. PCT/KR2020/009636.
(Continued)

*Primary Examiner* — Cindy Trandai
(74) *Attorney, Agent, or Firm* — Jefferson IP Law, LLP

(57) ABSTRACT

A method and apparatus for fast communication between the master and the slave connected via Bluetooth low energy (BLE) is provided. An electronic device includes a communication circuit configured to perform wireless communication, at least one processor operatively connected to the communication circuit, and a memory operatively connected to the processor, wherein the memory may store instructions that, when executed, cause the processor to receive a first designated message associated with a connection parameter update through the communication circuit from an external electronic device connected via a Bluetooth low energy (BLE) protocol, determine, in response to reception of the first designated message, a designated scheme for the connection parameter update based on an attribute of the external electronic device, determine a time point of an instant based on the determined designated scheme, transmit a second designated message including the determined instant time point to the external electronic device, and make an update to connection parameters when the time point of the instant is reached.

21 Claims, 21 Drawing Sheets

(51) Int. Cl.
*H04W 4/80* (2018.01)
*H04W 84/20* (2009.01)

(56) References Cited

U.S. PATENT DOCUMENTS

| | | | |
|---|---|---|---|
| 9,999,093 B2 | 6/2018 | Tan et al. | |
| 2014/0064212 A1* | 3/2014 | Ko | H04W 4/80 370/329 |
| 2014/0329465 A1* | 11/2014 | Palin | H04W 76/14 455/41.2 |
| 2015/0163846 A1 | 6/2015 | Weizman et al. | |
| 2015/0230285 A1* | 8/2015 | Park | H04W 76/19 455/41.2 |
| 2015/0358780 A1* | 12/2015 | Saari | H04W 4/02 370/252 |
| 2016/0014550 A1 | 1/2016 | Chddarwar et al. | |
| 2017/0094452 A1* | 3/2017 | Kamijo | H04W 72/085 |
| 2017/0164420 A1* | 6/2017 | Tan | H04W 4/80 |
| 2017/0187828 A1* | 6/2017 | Soji | H04W 52/0254 |
| 2019/0075611 A1 | 3/2019 | Rabii et al. | |
| 2019/0246221 A1* | 8/2019 | Shariati | H04L 1/00 |
| 2019/0327675 A1* | 10/2019 | Takeuchi | H04W 76/14 |
| 2020/0053831 A1 | 2/2020 | Park et al. | |

OTHER PUBLICATIONS

Sig Proprietary Bluetooth, "Bluetooth SIG Proprietary Bluetooth Core Specification v5.0", Dec. 6, 2016, pp. 1-2822, XP055567380, Retrieved from the Internet: URL:https:llwww.bluetooth.org/en-us/specification/adopted-specifications [retrieved on Mar. 11, 2019].
Extended European Search Report dated Mar. 21, 2022, issued in European Patent Application No. 20850978.6-1212.

* cited by examiner

APPARATUS AND METHOD FOR FAST COMMUNICATION BETWEEN MASTER AND SLAVE

CROSS-REFERENCE TO RELATED APPLICATION(S)

This application is based on and claims priority under 35 U.S.C. 119(a) of a Korean patent application number 10-2019-0096404, filed on Aug. 7, 2019, in the Korean Intellectual Property Office, the disclosure of which is herein incorporated by reference in its entirety.

BACKGROUND

1. Field

The disclosure relates to a method and apparatus for fast communication between electronic devices connected through Bluetooth low energy (BLE).

2. Description of Related Art

Bluetooth low energy (BLE) technology refers to a communication protocol operating at a low power and may facilitate connection and communication with devices with limited power. In BLE communication, a device that makes a connection request and manages the connection is called a master, and a device that accepts the connection request and follows the connection management of the master is called a slave. In most cases, among devices, the device having relatively low power or requiring low power consumption may act as a slave.

When the amount of data exchanged between the master device and the slave device for a given time is small, power consumption decreases but rapid data exchange becomes difficult. Conversely, when the amount of data exchanged for the given time is large, power consumption increases but rapid data exchange may be possible. BLE technology provides a method for the two connected devices to dynamically change the connection parameters including the connection interval and the slave latency depending on the situation.

Although the related art provides a method for flexibly adjusting the connection parameters according to the situation, it does not present a method for reducing the time required for the adjustment process. Hence, in a situation where a rapid or immediate operation needs to be performed after the necessity of changing the connection parameters is recognized, the applicability of scenarios related to the utilization of the corresponding device (e.g., slave) may be lowered.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus capable of supporting fast communication between electronic devices connected through Bluetooth low energy (BLE) (e.g., master and slave).

Another aspect of the disclosure is to provide a method and apparatus capable of shortening the time required by a negotiation process for the connection parameters between the master and the slave.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit configured to perform wireless communication, at least one processor operatively connected to the communication circuit, and a memory operatively connected to the processor, wherein the memory may store instructions that, when executed, cause the processor to receive a first designated message associated with a connection parameter update through the communication circuit from an external electronic device connected via a Bluetooth low energy (BLE) protocol, determine, in response to reception of the first designated message, a designated scheme for the connection parameter update based on an attribute of the external electronic device, determine a time point of an instant based on the determined designated scheme, transmit a second designated message including the determined instant time point to the external electronic device, and make an update to connection parameters when the time point of the instant is reached.

In accordance with another aspect of the disclosure, an electronic device is provided. The electronic device includes a communication circuit configured to perform wireless communication, at least one processor operatively connected to the communication circuit, and a memory operatively connected to the processor, wherein the memory may store instructions that, when executed, cause the processor to initiate an operation related to a connection update through the communication circuit based on a designated event and an external electronic device connected via a Bluetooth low energy (BLE) protocol, open reception (Rx) based on a specified interval less than or equal to an old connection interval and an old slave latency according to initiation of the operation related to the connection update, receive, based on the operation related to the connection update, a message that includes an instant time point determined by the external electronic device and indicates an update of connection parameters from the external electronic device, and make an update to the connection parameters when the instant time point is reached.

In accordance with another aspect of the disclosure, an operation method of an electronic device is provided. The method includes receiving a first designated message associated with a connection parameter update through a communication circuit from an external electronic device connected via a Bluetooth low energy (BLE) protocol, determining, in response to reception of the first designated message, a designated scheme for the connection parameter update based on an attribute of the external electronic device, determining a time point of an instant based on the determined designated scheme, transmitting a second designated message including the instant time point to the external electronic device, and making an update to connection parameters when the time point of the instant is reached.

To solve the above problems, various embodiments of the disclosure may provide a computer-readable storage medium storing a program that causes a processor to execute the above method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments, the electronic device and operation method thereof may shorten the time point of the instance when the values of the connection parameters between two devices connected through BLE (e.g., master and slave) need to be dynamically changed. According to various embodiments, it is possible to shorten the time from when the need to adjust the connection parameters is recognized to when the adjustment is actually applied, and the two devices can respond faster to changing situations. According to various embodiments, when the connection parameter values between two devices connected through BLE are dynamically changed, it is possible to advance the time point of the instant. This may shorten the time from when the need to adjust the connection parameters is recognized to when the adjustment is actually applied, enabling the connected devices to respond faster to changing situations. Consequently, the user can experience delay-free usage scenarios.

Figure 1:
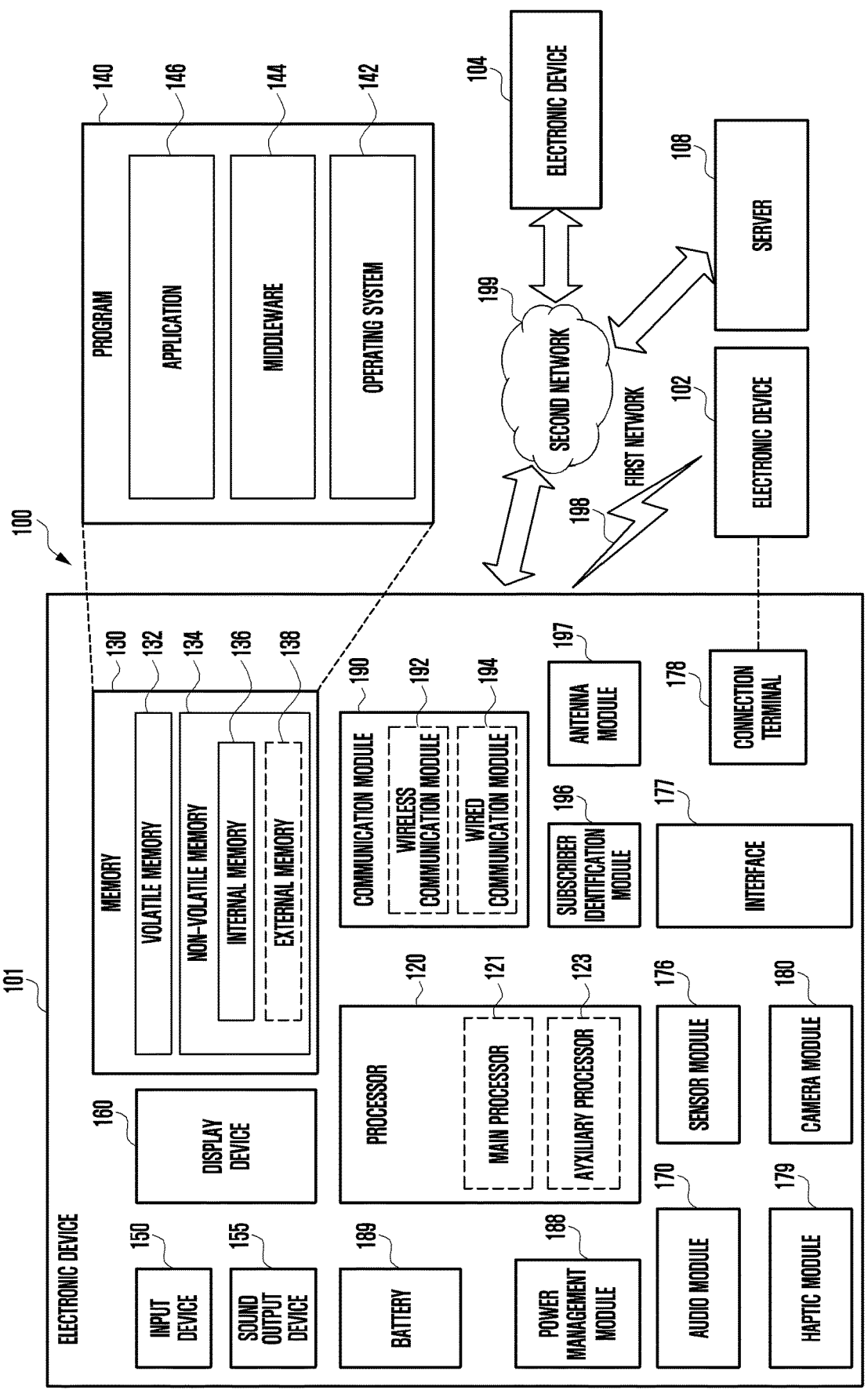
FIG. 1 illustrates an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 (e.g., a transceiver) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio-frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

Figure 2:
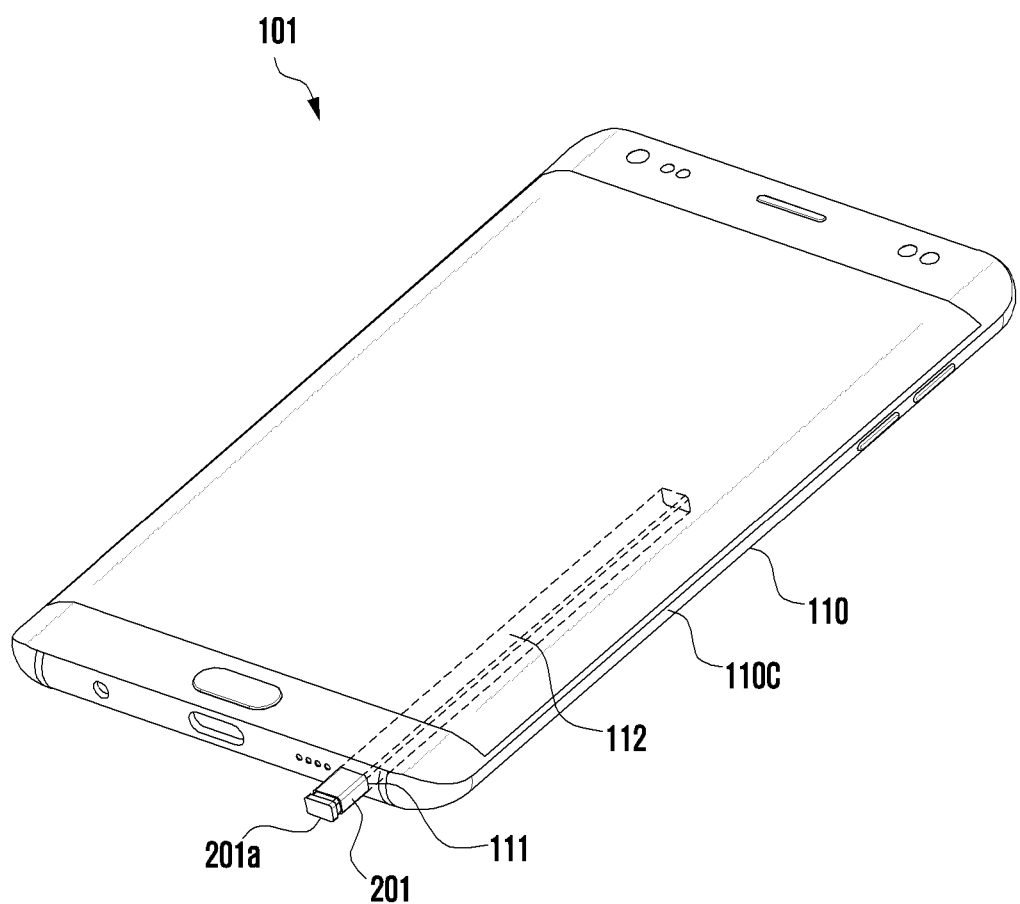
FIG. 2 is a perspective view of an electronic device including a digital pen according to an embodiment of the disclosure.

FIG. 2 is a perspective view of an electronic device including a digital pen according to an embodiment of the disclosure.

Referring to FIG. 2, in one embodiment, the electronic device 101 may include the components shown in FIG. 1, and may include a structure into which a digital pen 201 (e.g., stylus pen) can be inserted.

In one embodiment, the electronic device 101 may include a housing 110, and may include a hole 111 at a portion of the housing 110, for example, the side surface 110C. In one embodiment, the electronic device 101 may include a storage space 112 connected to the hole 111, and the digital pen 201 may be inserted into the storage space 112.

As shown in the figure, the digital pen 201 may include a pressable button 201a at one end to facilitate taking the digital pen 201 out of the storage space 112 of the electronic device 101. In one embodiment, when the button 201a is pressed, a repulsion mechanism (e.g., at least one spring) configured in association with the button 201a is activated, so that the digital pen 201 can be released from the storage space 112.

Figure 3:
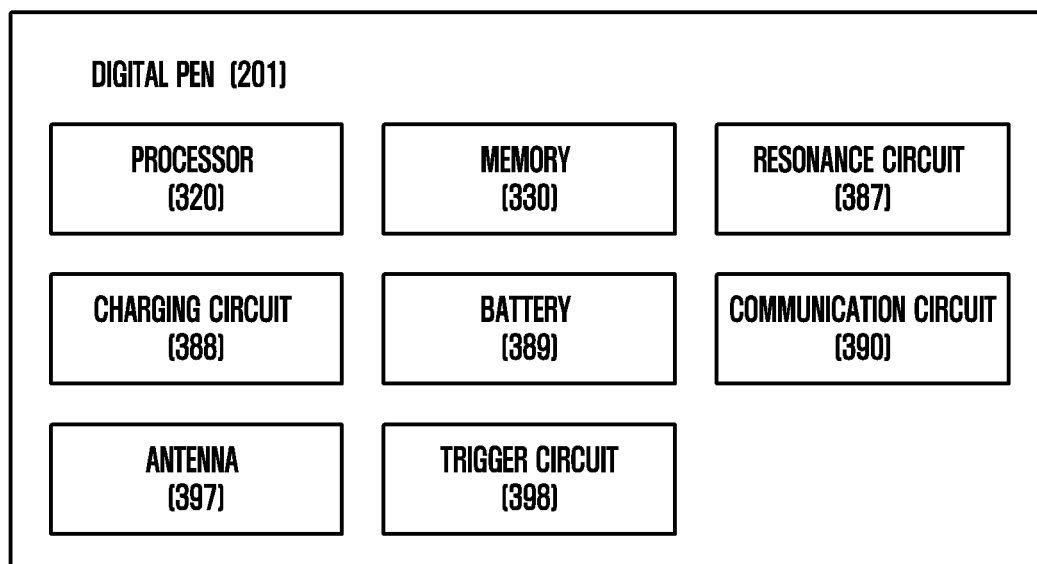
FIG. 3 is a block diagram of the digital pen according to an embodiment of the disclosure.

FIG. 3 is a block diagram of the digital pen according to an embodiment of the disclosure.

Referring to FIG. 3, in one embodiment, the digital pen 201 may include a processor 320, a memory 330, a resonance circuit 387, a charging circuit 388, a battery 389, a communication circuit 390, an antenna 397, and/or a trigger circuit 398. In a certain embodiment, the processor 320, at least a portion of the resonance circuit 387, and/or at least a portion of the communication circuit 390 of the digital pen 201 may be configured on a printed circuit board or in the form of a chip. The processor 320, the resonance circuit 387, and/or the communication circuit 390 may be electrically connected to the memory 330, the charging circuit 388, the battery 389, the antenna 397, or the trigger circuit 398. In one embodiment, the digital pen 201 may be composed only of the resonance circuit 387 and a button.

In one embodiment, the processor 320 may include a customized hardware module or a generic processor configured to execute software (e.g., application program). The processor 320 may include hardware components (functions) including at least one of various sensors provided in the digital pen 201, a data measurement module, an input/output interface, a module managing the state or environment of the digital pen 201, or a communication module, and may also include software components (programs). For example, the processor 320 may include hardware, software, or firmware, or a combination thereof. In one embodiment, the processor 320 may receive a proximity signal corresponding to an electromagnetic field signal generated from a digitizer (not shown) of the electronic device 101 through the resonance circuit 387. When the proximity signal is detected, the processor 320 may control the resonance circuit 387 to transmit an electromagnetic resonance (EMR) input signal to the electronic device 101.

In one embodiment, the memory 330 may store information related to the operation of the digital pen 201. For example, the information may include information for communication with the electronic device 101 and frequency information related to the input operation of the digital pen 201.

In one embodiment, the resonance circuit 387 may include at least one of a coil, an inductor, or a capacitor. The resonant circuit 387 can be used by the digital pen 201 to generate a signal that includes a resonant frequency. For example, the digital pen 201 may use at least one of an electro-magnetic resonance (EMR) scheme, an active electrostatic (AES) scheme, or an electrically coupled resonance (ECR) scheme for signal generation. When the signal is transmitted by using the EMR scheme, the digital pen 201 may generate a signal including a resonance frequency based on electromagnetic fields generated by an inductive panel of the electronic device 101. When the signal is transmitted by using the AES scheme, the digital pen 201 may generate a signal by using capacitive coupling with the electronic device 101. When the signal is transmitted by using the ECR scheme, the digital pen 201 may generate a signal including a resonance frequency based on electric fields generated by a capacitive element of the electronic device 101. In one embodiment, the resonance circuit 387 may be used to change the intensity or frequency of an electromagnetic field according to the manipulation state of the user. For example, the resonance circuit 387 may provide a frequency for recognizing a hovering input, a drawing input, a button input, or an erasing input.

In one embodiment, when connected to the resonance circuit 387 based on a switching circuit, the charging circuit 388 may rectify a resonant signal generated by the resonant circuit 387 into a DC signal and supply the DC signal to the battery 389. In one embodiment, the digital pen 201 may check whether it is inserted into the electronic device 101 based on the voltage level of the DC signal detected by the charging circuit 388.

In one embodiment, the battery 389 may be configured to store power required for the operation of the digital pen 201. The battery 389 may include, for example, a lithium-ion battery or a capacitor, and may be rechargeable or replaceable. In one embodiment, the battery 389 may be charged by using power (e.g. DC signal (DC power)) supplied from the charging circuit 388.

In one embodiment, the communication circuit 390 may be configured to perform a wireless communication function between the digital pen 201 and the communication module 190 of the electronic device 101. In one embodiment, the communication circuit 390 may transmit status information and input information of the digital pen 201 to the electronic device 101 by using a short-range communication scheme. For example, the communication circuit 390 may transmit direction information (e.g., motion sensor data) of the digital pen 201 obtained through the trigger circuit 398, voice information picked up through a microphone (not shown), or remaining level information of the battery 389 to the electronic device 101. For example, the short-range communication scheme may include at least one of Bluetooth, Bluetooth low energy (BLE), or Wi-Fi.

In one embodiment, the antenna 397 may be used to transmit or receive a signal or power to or from the outside (e.g., electronic device 101). In one embodiment, the digital pen 201 may include plural antennas 397, and may select at least one antenna 397 among them suitable for the communication scheme. Through the selected at least one antenna 397, the communication circuit 390 may exchange a signal or power with the outside (e.g., electronic device 101).

In one embodiment, the trigger circuit 398 may include at least one button or a sensor circuit. In one embodiment, the processor 320 may identify the input mode (e.g., touch or press) or type (e.g., EMR button or BLE button) of the button of the digital pen 201. In one embodiment, the sensor circuit may generate an electrical signal or data value corresponding to an internal operating state or external environmental state of the digital pen 201. For example, the sensor circuit may include at least one of a motion sensor, a remaining battery level sensor, a pressure sensor, an optical sensor, a temperature sensor, a geomagnetic sensor, or a biometric sensor. In one embodiment, the trigger circuit 398 may transmit a trigger signal to the electronic device 101 according to a button input signal or a sensor input signal.

Figure 4:
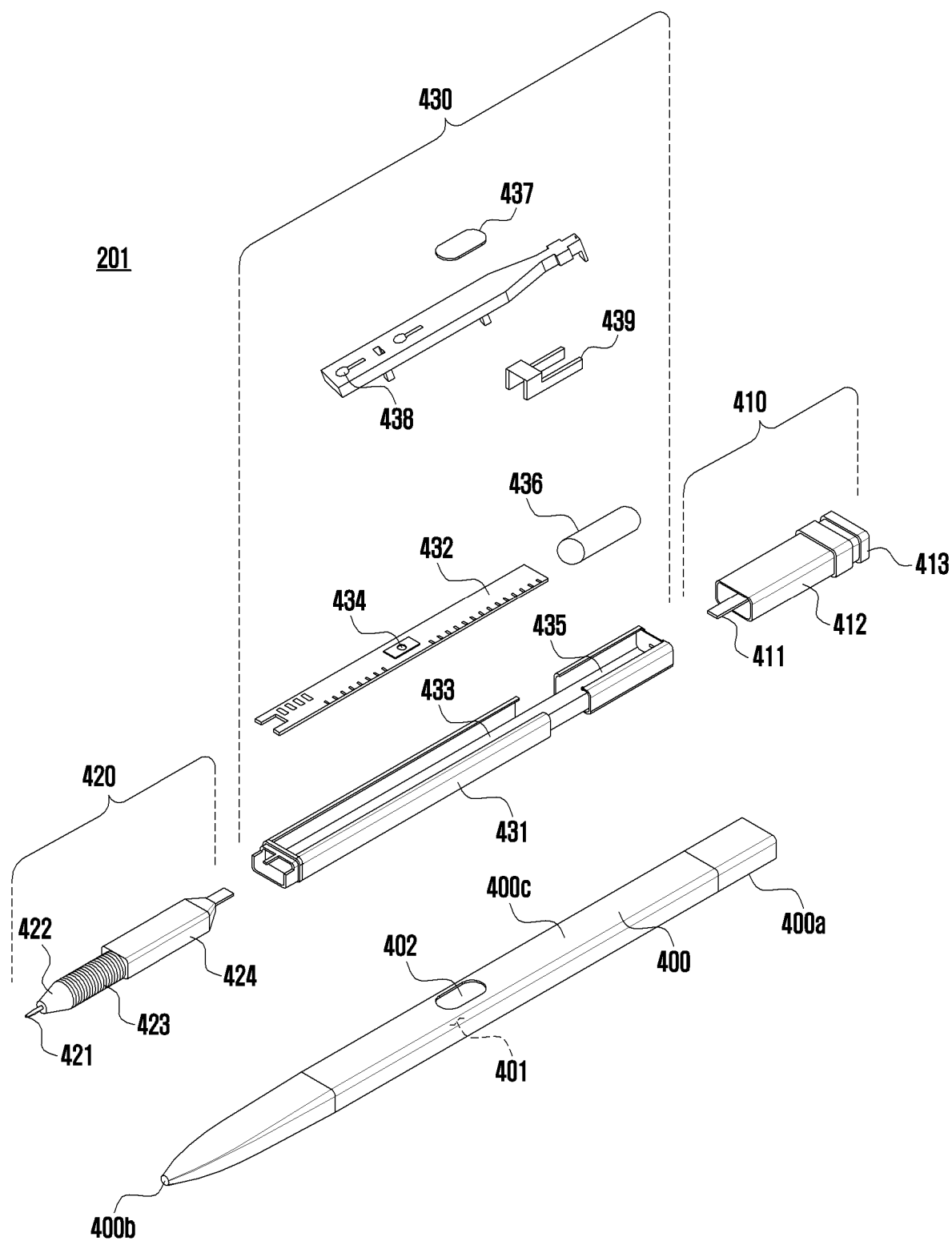
FIG. 4 is an exploded perspective view of the digital pen according to an embodiment of the disclosure.

FIG. 4 is an exploded perspective view of the digital pen according to an embodiment of the disclosure.

Referring to FIG. 4, the digital pen 201 may include a pen housing 400 constituting the external shape of the digital pen 201 and an inner assembly inside the pen housing 400. As shown in the figure, the inner assembly includes all the components mounted inside the digital pen 201 and may be inserted into the pen housing 400 in one assembly operation.

In one embodiment, the pen housing 400 may include a first end 400a, a second end 400b, and a body 400c between the first end 400a and the second end 400b, may have an elongated shape between the first end 400a and the second end 400b, and may include a storage space 401 therein. The pen housing 400 may have an elliptical cross-section with major and minor axes, and may be formed in the shape of an elliptic cylinder as a whole. The storage space 112 of the electronic device 101 may also have an elliptical cross section corresponding to the shape of the pen housing 400. The pen housing 400 may be made of synthetic resin (e.g., plastic) and/or a metallic material (e.g., aluminum). In one embodiment, the second end 400b of the pen housing 400 may be made of a synthetic resin material.

In one embodiment, the inner assembly may have an elongated shape corresponding to the shape of the pen housing 400. The inner assembly can be roughly divided into three parts in the longitudinal direction. For example, the inner assembly may include an ejection member 410 disposed at a position corresponding to the first end 400a of the pen housing 400, a coil segment 420 disposed at a position corresponding to the second end 400b of the pen housing 400, and a circuit substrate segment 430 disposed at a position corresponding to the body 400c between the first end 400a and the second end 400b of the pen housing 400.

In one embodiment, the ejection member 410 may include a mechanism for taking the digital pen 201 out of the storage space 112 of the electronic device 101. In one embodiment, the ejection member 410 may include a shaft 411, an ejection body 412 disposed around the shaft 411 and forming an overall appearance of the ejection member 410, and a button portion 413. When the inner assembly is fully inserted into the pen housing 400, the region including the shaft 411 and the ejection body 412 may be surrounded by the first end 400a of the pen housing 400, and the button portion 413 (e.g., button 201a in FIG. 2) may be exposed outside the first end 400a. A plurality of components (not shown), such as cam members or elastic members, may be arranged in the ejection body 412 to form a push-pull structure. In one embodiment, the button portion 413 may be substantially engaged with the shaft 411 to thereby perform a linear reciprocating motion relative to the ejection body 412. In various embodiments, the button portion 413 may include a button with a locking structure so that the user can take out the digital pen 201 by using a fingernail. In one embodiment, the digital pen 201 may include a sensor that detects a linear reciprocating motion of the shaft 411, providing another input mode.

In one embodiment, the coil segment 420 may include a pen tip 421 exposed to the outside of the second end 400b when the inner assembly is completely inserted into the pen housing 400, a packing ring 422, a coil 423 wound several times, and/or a pen pressure sensing portion 424 for sensing a change in pressure applied to the pen tip 421. In one embodiment, the packing ring 422 may be made of epoxy, rubber, urethane, or silicone. The packing ring 422 may be used for waterproof and dustproof purposes, and may protect the coil segment 420 and the circuit substrate segment 430 from water or dust. In one embodiment, the coil 423 may form a resonance frequency in a configured frequency band (e.g., about 500 KHz), and may be combined with at least one capacitive element (e.g., capacitor) to adjust the resonance frequency in a certain range.

In one embodiment, the circuit substrate segment 430 may include a base 431, a printed circuit board 432 whose at least one surface is surrounded by the base 431, a switch 434, a battery 436, a side button 437, a support member 438, and an antenna structure 439 (e.g., antenna 397 in FIG. 3). In one embodiment, a substrate seating portion 433 for the printed circuit board 432 may be formed on the upper surface of the base 431, and the printed circuit board 432 may be seated on and fixed to the substrate seating portion 433. In one embodiment, the printed circuit board 432 may include an upper surface and a lower surface, a variable capacity capacitor connected to the coil 423 or the switch 434 may be disposed on the upper surface, and a charging circuit (not shown) (e.g., charging circuit 388 in FIG. 3), the battery 436, or a communication circuit (not shown) (e.g., communication circuit 390 in FIG. 3) may be disposed on the lower surface. The battery 436 may include an electric double layer capacitor (EDLC). The charging circuit 388 is disposed between the coil 423 and the battery 436 and may include a voltage detector circuitry and a rectifier.

In one embodiment, the antenna may include the antenna structure 439 as shown in FIG. 4, and/or an antenna embedded in the printed circuit board 432. In various embodiments, the switch 434 may be arranged on the printed circuit board 432. The side button 437 provided in the digital pen 201 may be used to press the switch 434 and may be exposed to the outside through a side opening 402 of the pen housing 400. The side button 437 is supported by the support member 438, and when there is no external force acting on the side button 437, the support member 438 may apply an elastic restoring force to enable the side button 437 to restore or maintain a preset position.

In one embodiment, the circuit substrate segment 430 may include different packing rings such as an O-ring. For example, O-rings made of an elastic body may be disposed at both ends of the base 431 to form a sealing structure between the base 431 and the pen housing 400. In a certain embodiment, the support member 438 may partially adhere to the inner wall of the pen housing 400 around the side opening 402 to form a sealing structure. For example, the circuit substrate segment 430 may also form a waterproof and dustproof structure similar to the packing ring 422 of the coil segment 420.

In one embodiment, the digital pen 201 may include a battery seating portion 435 on the upper surface of the base 431, on which the battery 436 may be disposed. The battery 436 that can be mounted on the battery seating portion 435 may include, for example, a cylinder type battery.

In one embodiment, the digital pen 201 may include a microphone (not shown). The microphone may be directly connected to the printed circuit board 432 or may be connected to a separate flexible printed circuit board (FPCB) (not shown) connected to the printed circuit board 432. In various embodiments, the microphone may be disposed at a position parallel to the side button 437 in the longitudinal direction of the digital pen 201.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, the electronic device 101 may include: a communication circuit (e.g., wireless communication module 192 in FIG. 1) configured to perform wireless communication; at least one processor (e.g., processor 120 in FIG. 1) operatively connected to the communication circuit; and a memory (e.g., memory 130 in FIG. 1) operatively connected to the processor, wherein the memory may store instructions that, when executed, cause the processor 120 to: receive a first designated message associated with a connection parameter update through the communication circuit from an external electronic device connected via the Bluetooth low energy (BLE) protocol; determine, in response to the reception of the first designated message, a designated scheme for the connection parameter update based on the attribute of the external electronic device; determine the time point of the instant based on the determined designated scheme; transmit a second designated message including the instant time point to the external electronic device; and make an update to the connection parameters when the time point of the instant is reached.

In various embodiments, the first designated message may include a connection parameter request message, and the instructions may be configured to cause the processor 120 to determine the designated scheme upon receiving the connection parameter request message requesting a change of the connection parameters.

In various embodiments, the first designated message may include a connection parameter response message, and the instructions may be configured to cause the processor 120 to: transmit a connection parameter request message requesting a change of the connection parameters to the external electronic device; receive a connection parameter response message accepting the change request for the connection parameters as a response to the connection parameter request message from the external electronic device; and determine the designated scheme upon receiving the connection parameter response message.

In various embodiments, the first designated message may include a connection update request message, and the instructions may be configured to cause the processor 120 to: receive a connection update request message from the external electronic device; transmit, in response to the connection update request message, a connection update response message to the external electronic device; transmit a connection parameter request message requesting a change of the connection parameters to the external electronic device; receive a connection parameter response message as a response to the connection parameter request message from the external electronic device; and determine the designated scheme upon receiving the connection parameter response message.

In various embodiments, the connection parameters may include at least one of a connection interval, a slave latency, or a timeout.

In various embodiments, the attribute of the external electronic device may include an indication of whether an adaptive connection update is supported, and the instructions may be configured to cause the processor 120 to: determine, when the attribute of the external electronic device supports the adaptive connection update, a first designated scheme to be the designated scheme for determining the instant time point; and determine, when the attribute of the external electronic device does not support the adaptive connection update, a second designated scheme to be the designated scheme for determining the instant time point.

In various embodiments, the first designated scheme may include configuring an interval for opening the reception (Rx) of the external electronic device to be a period shorter than the old slave latency.

In various embodiments, the second designated scheme may include setting an interval value for opening the reception (Rx) of the external electronic device based on the old slave latency and the old connection interval.

In various embodiments, the instructions may be configured to cause the processor 120 to: change the value of the connection interval to a first designated value; and change the value of the slave latency to a second designated value, and the first designated value may include a value different from the old value of the connection interval and the second designated value may include a value different from the old value of the slave latency.

In various embodiments, the instructions may be configured to cause the processor 120 to process a connection event after waiting for a period of time excluding the time corresponding to the slave latency.

In various embodiments, the second designated message may include a connection update indication message including the determined instant time point.

In various embodiments, the instructions may be configured to cause the processor 120 to perform an operation related to the connection parameter update at least based on an event corresponding to detachment of the external electronic device from the electronic device, an event corresponding to execution of a specific application in the electronic device, or an event corresponding to execution of a specific operation in the external electronic device.

According to various embodiments of the disclosure, the electronic device 201 may include: a communication circuit (e.g., communication circuit 390 in FIG. 3) configured to perform wireless communication; at least one processor (e.g., processor 320 in FIG. 3) operatively connected to the communication circuit; and a memory (e.g., memory 330 in FIG. 3) operatively connected to the processor 320, wherein the memory may store instructions that, when executed, cause the processor 320 to: initiate an operation related to a connection update through the communication circuit based on a designated event and an external electronic device connected via a Bluetooth low energy (BLE) protocol; open the reception (Rx) based on a specified interval less than or equal to the old connection interval and the old slave latency according to the initiation of the operation related to the connection update; receive, based on the operation related to the connection update, a connection update indication message including the instant time point determined by the external electronic device from the external electronic device; and make an update to the connection parameters when the instant time point is reached.

In various embodiments, the instructions may be configured to cause the processor 320 to: transmit, based on the designated event, a connection parameter request message requesting a change of the connection parameters to the external electronic device; and initiate, based on transmitting the connection parameter request message, the operation related to the connection update.

In various embodiments, the instructions may be configured to cause the processor 320 to: receive a connection parameter request message requesting a change of the connection parameters from the external electronic device; transmit, in response to the connection parameter request message, a connection parameter response message accepting the change request for the connection parameters to the external electronic device; and initiate, based on transmitting the connection parameter response message, the operation related to the connection update.

In various embodiments, the instructions may be configured to cause the processor 320 to: transmit a connection update request message to the external electronic device; receive a connection update response message as a response to the connection update request message from the external electronic device; receive a connection parameter request message requesting a change of the connection parameters from the external electronic device; transmit, in response to the connection parameter request message, a connection parameter response message to the external electronic device; and initiate, based on transmitting the connection parameter response message, the operation related to the connection update.

In various embodiments of the disclosure, in Bluetooth low energy (BLE) communication between devices, the device that makes a connection request and manages the connection is called a master (e.g., electronic device 101 in FIG. 1 or FIG. 2), and the device that accepts the connection request of the master and conforms to the connection management of the master is called a slave (e.g., digital pen 201 in FIG. 2 or FIG. 3). For example, the master may indicate a device that initiates and manages the connection, and the slave may indicate a device that accepts a connection request according to the timing of the master. In one embodiment, the devices can be classified as an advertiser and a scanner before being connected through BLE, and can be classified as a master and a slave after being connected. In one embodiment, among the devices, a device having relatively low power or requiring low power consumption (e.g., digital pen 201) may act as a slave.

In various embodiments, the method for changing the connection parameters (e.g., connection interval (CI), slave latency (SL)) between two devices (e.g., master and slave) connected via BLE is defined, and it can be executed dynamically not only when the connection is being created but also when the connection is established. For example, BLE technology can decrease or increase the amount of data exchanged per unit time by changing the connection parameters. In one embodiment, when the amount of data exchanged between the master and the slave for a given time is small, power consumption decreases but rapid data exchange becomes difficult. Conversely, when the amount of data exchanged for the given time is large, power consumption increases but rapid data exchange can be possible.

In one embodiment, when two devices connected via BLE starts and ends data exchange through one channel, this is called a connection event (CE). The next connection event may be processed through another channel, and the time interval between two consecutive connection events is called a connection interval (CI). In one embodiment, to reduce the power consumed by data exchange, the slave may not transmit data during a preset number of connection events, and this number of connection events is called slave latency (SL). Consequently, when communication between two devices connected via BLE is composed of two or more consecutive connection events, the actual data exchange period per unit time and the amount of data exchanged per unit time can be greatly affected by the connection interval and the slave latency. For example, when the values of the connection interval and slave latency increase, as the number of data exchanges per unit time decreases, power consumption may decrease but rapid data transfer may become difficult. In the opposite case, power consumption may increase but data exchange can be performed rapidly.

Figure 5:
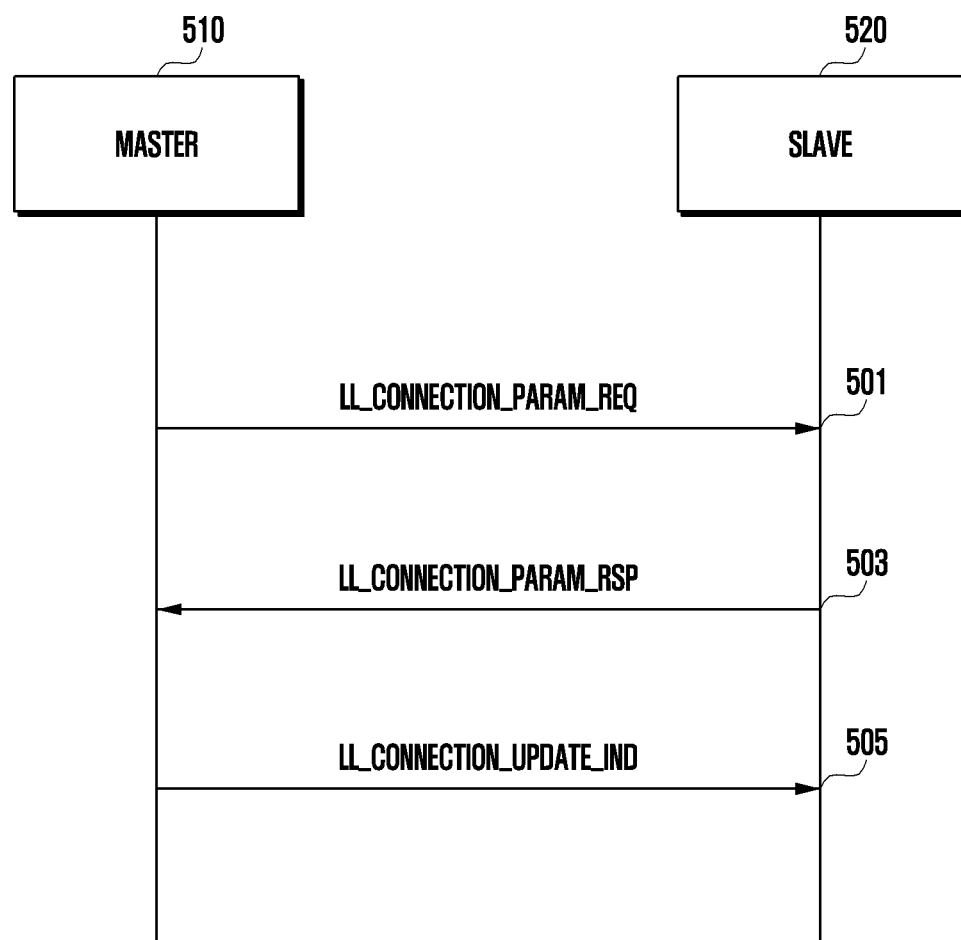
FIG. 5 is a sequence diagram illustrating an example of a connection parameter negotiation process according to an embodiment of the disclosure.
Figure 6:
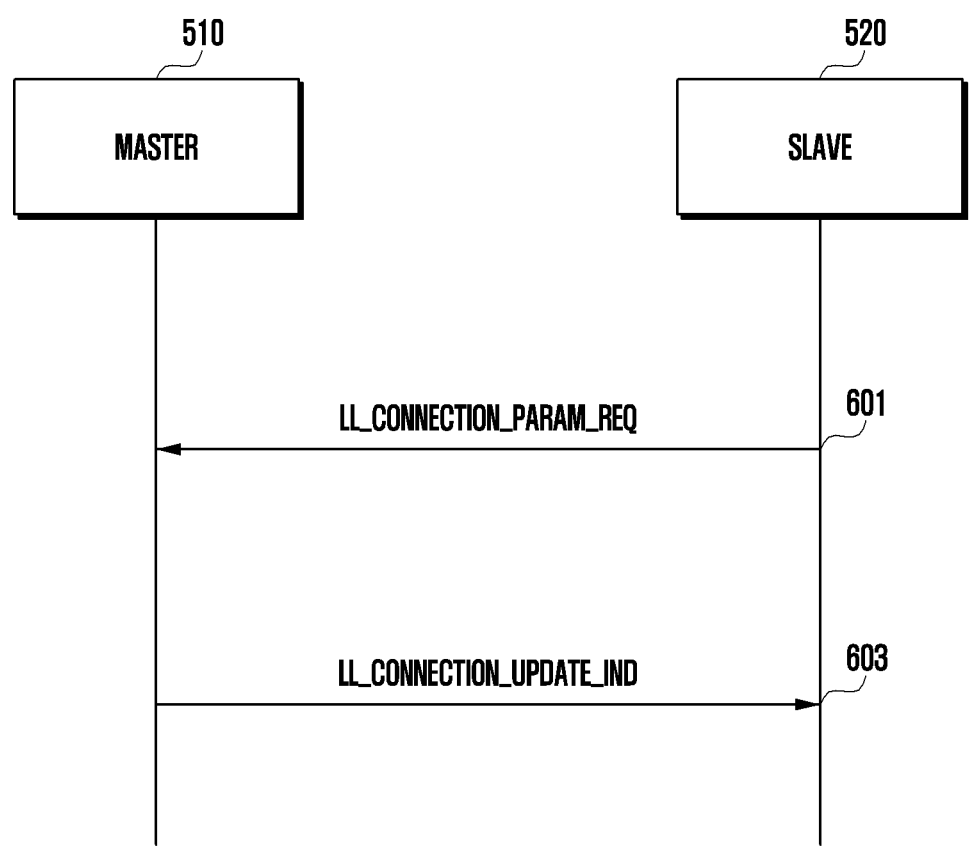
FIG. 6 is a sequence diagram illustrating an example of a connection parameter negotiation process according to an embodiment of the disclosure.
Figure 7:
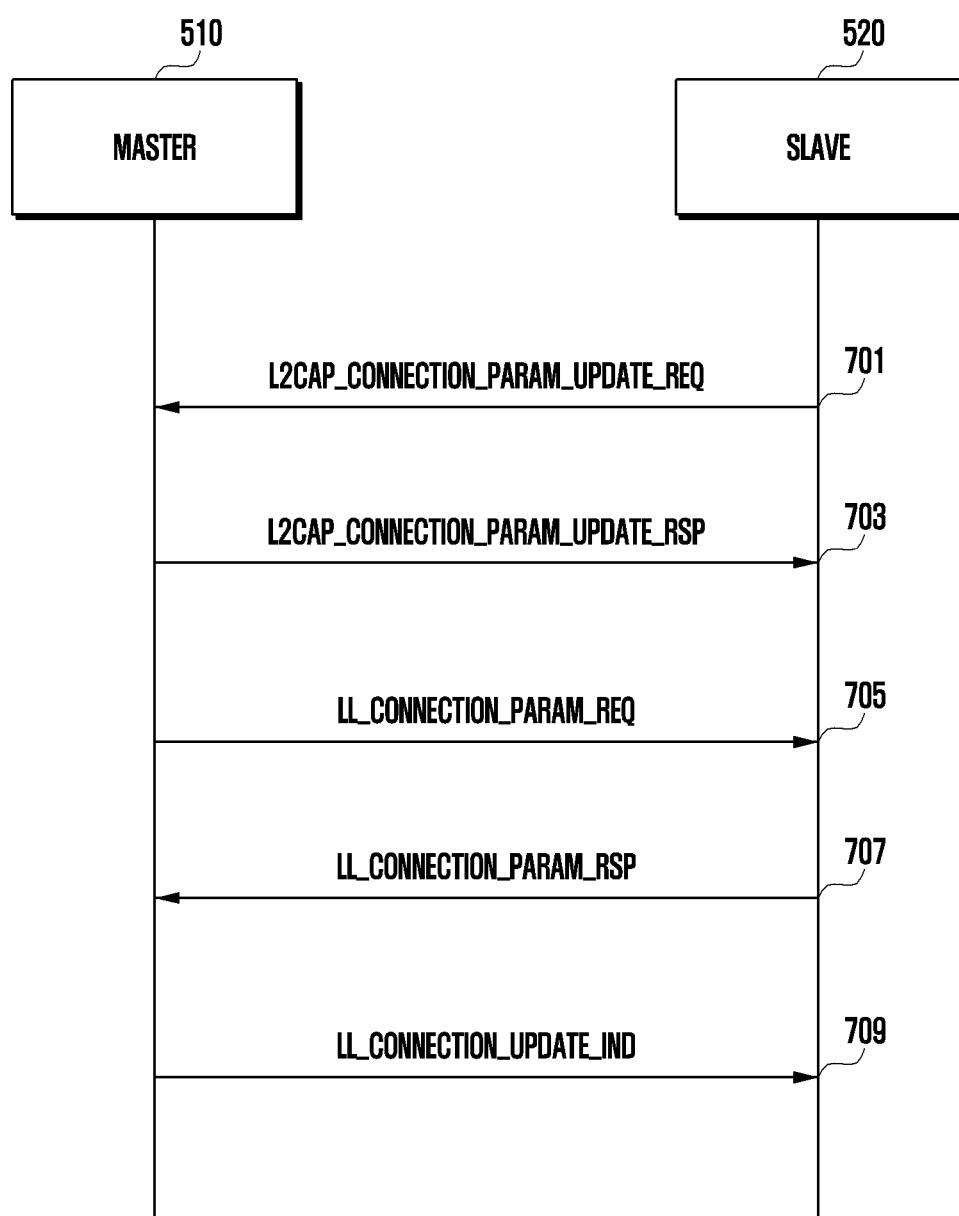
FIG. 7 is a sequence diagram illustrating an example of a connection parameter negotiation process according to an embodiment of the disclosure.

In one embodiment, as shown in FIGS. 5, 6 and 7, through the connection parameter negotiation operation (e.g., connection parameter request procedure), two devices connected via BLE can dynamically change the connection parameters including the connection interval and slave latency depending on the situation.

FIG. 5 is a sequence diagram illustrating an example of a connection parameter negotiation process according to an embodiment of the disclosure.

The embodiment of FIG. 5 illustrates a case where the master (e.g., electronic device 101 in FIG. 1 or 2) initiates the connection parameter negotiation process (e.g., connection parameter request procedure).

Referring to FIG. 5, at operation 501, when the value of one or more connection parameters needs to be changed, a master 510 may include desired change values in a connection parameter request message (e.g., LL_CONNECTION_PARAM_REQ) and transmit the message to the slave 520 (e.g., digital pen 201 in FIG. 2 or 3). In one embodiment, the master 510 may determine to change parameter values based on at least detecting detachment of the slave 520 from the master 510, detecting execution of a specific application in the master 510 in association with a designated function (e.g., function using the slave 520), or detecting execution of a designated operation (e.g., a function based on the button of the slave 520) in the slave 520. In one embodiment, the designated function using the slave 520 may include a drawing function or a mouse function using the slave 520.

Upon receiving the connection parameter request message from the master 510, at operation 503, the slave 520 may transmit a connection parameter response message (e.g., LL_CONNECTION_PARAM_RSP) including an indication of whether to accept the connection parameter request to the master 510. In one embodiment, upon receiving a connection parameter request from the master 510, the slave 520 may provide the master 510 with a response to apply the values of the connection interval and slave latency changed by the master 510 according to the connection parameter request message. In one embodiment, when the slave 520 rejects the application of the values of the connection interval and the slave latency changed by the master 510 according to the connection parameter request message, the slave 520 may transmit a rejection message (e.g., LL_REJECT_IND or LL_REJECT_EXT_IND) other than a connection parameter response message to the master 510, in which case the corresponding process may be terminated without transmission of a connection update indication message by the master 510.

Upon receiving the connection parameter response message from the slave 520, at operation 505, the master 510 may transmit the slave 520 a connection update indication message (e.g., LL_CONNECTION_UPDATE_IND) including finally determined connection parameter values. In one embodiment, upon receiving a connection parameter response message (e.g., LL_CONNECTION_PARAM_RSP) from the slave 520, the master 510 may identify the target slave 520 that has transmitted the connection parameter response message based on the received connection parameter response message. For example, the master 510 can identify whether the slave 520 having transmitted the connection parameter response message is a designated (or pre-agreed) slave capable of supporting an adaptive connection update of various embodiments. In one embodiment, the master 510 may identify the slave 520 based on identification information (e.g., device ID) of the slave 520.

In one embodiment, if the slave 520 having transmitted the connection parameter response message is a designated slave, the master 510 may calculate the delta, which is a time interval between the message related to a connection parameter update (e.g., connection parameter response message) and the instant, based on the first designated scheme. For example, the master 510 may calculate the delta based on the first designated scheme and determine the time point of the instant according to the calculated delta. The instant may indicate the point in time at which the first connection event where newly changed values of the connection parameters are applied is generated.

In one embodiment, if the slave 520 having transmitted the connection parameter response message is not a designated slave, the master 510 may calculate the delta, which is a time interval between the message related to a connection parameter update (e.g., connection parameter response message) and the instant, based on the second designated scheme. For example, the master 510 may calculate the delta based on the second designated scheme and determine the time point of the instant according to the calculated delta. The first designated scheme and the second designated scheme according to one embodiment will be described below with reference to the drawings.

In one embodiment, when the slave 520 transmits a connection parameter response message to the master 510, the slave 520 may then apply the connection parameter values corresponding to the values of the connection parameters (e.g., connection interval and slave latency) determined by the master 510 carried by (or included in) a connection update indication message transmitted by the master 510 (or received from the master 510).

FIG. 6 is a sequence diagram illustrating an example of a connection parameter negotiation process according to an embodiment of the disclosure.

The embodiment of FIG. 6 illustrates a case where the slave 520 (e.g., digital pen 201 in FIG. 2 or 3) initiates the connection parameter negotiation process (e.g., connection parameter request procedure).

Referring to FIG. 6, at operation 601, when the value of one or more connection parameters needs to be changed, the slave 520 may include desired change values in a connection parameter request message (e.g., LL_CONNECTION_PARAM_REQ) and transmit the message to the master 510 (e.g., electronic device 101 in FIG. 1 or 2). In one embodiment, the slave 520 may determine to change parameter values based on at least detecting detachment of the slave 520 from the master 510, detecting execution of a specific application in the master 510 in association with a designated function (e.g., function using the slave 520), detecting execution of a designated operation (e.g., a function based on a button of the slave 520) in the slave 520. In one embodiment, the designated function using the slave 520 may include a drawing function or a mouse function using the slave 520.

Upon receiving the connection parameter request message from the slave 520, at operation 603, the master 510 may determine whether to accept the connection parameter change and transmit the slave 520 a connection update indication message (e.g., LL_CONNECTION_UPDATE_IND) including finally determined connection parameter values. In one embodiment, upon receiving a connection parameter request message from the slave 520, the master 510 may identify the target slave 520 that has transmitted the connection parameter request message based on the received connection parameter request message. For example, the master 510 can identify whether the slave 520 having transmitted the connection parameter request message is a designated (or pre-agreed) slave capable of supporting an adaptive connection update of various embodiments. In one embodiment, the master 510 may identify the slave 520 based on identification information (e.g., device ID) of the slave 520.

In one embodiment, if the slave 520 having transmitted the connection parameter request message is a designated slave, the master 510 may calculate the delta, which is a time interval between the message related to a connection parameter update (e.g., connection parameter request message) and the instant, based on the first designated scheme. For example, the master 510 may calculate the delta based on the first designated scheme and determine the time point of the instant according to the calculated delta. In one embodiment, if the slave 520 having transmitted the connection parameter request message is not a designated slave, the master 510 may calculate the delta, which is a time interval between the message related to a connection parameter update (e.g., connection parameter request message) and the instant, based on the second designated scheme. For example, the master 510 may calculate the delta based on the second designated scheme and determine the time point of the instant according to the calculated delta. The first designated scheme and the second designated scheme according to one embodiment will be described below with reference to the drawings.

In one embodiment, when the slave 520 receives the connection update indication message from the master 510, the slave 520 may then apply the connection parameter values corresponding to the values of the connection parameters (e.g., connection interval and slave latency) determined by the master 510 carried by (or included in) the connection update indication message.

In another embodiment, when the master 510 rejects the connection parameter request message from the slave 520, the master 510 may transmit a rejection message (e.g., LL_REJECT_IND or LL_REJECT_EXT_IND) other than a connection update indication message to the slave 520, in which case the corresponding process may be terminated.

FIG. 7 is a sequence diagram illustrating an example of a connection parameter negotiation process according to an embodiment of the disclosure.

The embodiment of FIG. 7 illustrates a case where the slave 520 (e.g., digital pen 201 in FIG. 2 or 3) indirectly initiates the connection parameter negotiation process (e.g., connection parameter request procedure). In one embodiment, the BLE protocol can be composed of two parts: a controller and a host. In one embodiment, the controller may include a physical layer (PL) and a link layer (LL), and the host may be executed on an application processor.

Referring to FIG. 7, at operation 701, the slave 520 may request, at the host layer, the master 510 to transmit a connection parameter request message (e.g., LL_CONNECTION_PARAM_REQ) indirectly through a logical link control and adaptation protocol (L2CAP) signaling channel. For example, the slave 520 may transmit, at the L2CAP layer, an L2CAP connection parameter update request message (L2CAP_CONNECTION_PARAM_UPDATE_REQ) to the master 510.

Upon receiving the connection parameter update request message from the slave 520, at operation 703, the master 510 may transmit a connection parameter update response message (e.g., L2CAP_CONNECTION_PARAM_UPDATE_RSP) to the slave 520 in response to the connection parameter update request message. In one embodiment, the slave 520 may open (or make an attempt) the reception (Rx) based on the connection slave latency in sequence, in parallel, or in reverse sequence with operation 703. In one embodiment, upon detecting a designated event, the slave 520 may make a reception (Rx) attempt based on a designated interval value (e.g., interval i) corresponding to a period shorter than the slave latency (e.g., interval less than or equal to the slave latency) based on the event detection. In one embodiment, the slave 520 may improve the update speed compared to the power consumed for reception by making a reception attempt based on the designated interval value only when the corresponding event occurs. In one embodiment, the slave 520 may make a reception (Rx) attempt with an interval less than or equal to the slave latency to reduce power consumption in normal situations.

In one embodiment, when a designated event is detected, the slave 520 may open the reception (or make a reception attempt) with an interval i to improve the update speed by using the interval i less than or equal to the slave latency instead of the slave latency. In one embodiment, the interval i may include a value of 0 or more (e.g., i≥0). In another embodiment, the slave 520 may replace the slave latency with an interval i less than or equal to the slave latency to improve the update speed. For example, the connection interval may be in units of time, the slave latency may be in units of number of times, and the interval i may be a replacement for the slave latency. In one embodiment, the time interval at which the slave 520 opens the reception (Rx) may be represented as, for example, "time interval=connection interval×z≤connection interval×slave latency", where the value of z may be optionally determined by the slave 520.

At operation 705, the master 510 may include, at the controller layer, change values of one or more connection parameters in a connection parameter request message (e.g., LL_CONNECTION_PARAM_REQ) and transmit the message to the slave 520.

Upon receiving the connection parameter request message from the master 510, at operation 707, the slave 520 may transmit the master 510 a connection parameter response message (e.g., LL_CONNECTION_PARAM_RSP) including an indication of whether to accept the corresponding connection parameter change. In another embodiment, when the slave 520 rejects the application of the values of the connection interval and the slave latency changed by the master 510 according to the connection parameter request message, the slave 520 may transmit a rejection message (e.g., LL_REJECT_IND or LL_REJECT_EXT_IND) other than a connection parameter response message to the master 510, in which case the corresponding process may be terminated without transmission of a connection update indication message by the master 510.

Upon receiving the connection parameter response message from the slave 520, at operation 709, the master 510 may transmit the slave 520 a connection update indication message (e.g., LL_CONNECTION_UPDATE_IND) including finally determined connection parameter values. In one embodiment, operation 709 may correspond to operation 505 in FIG. 5 or operation 603 in FIG. 6.

Figure 8A:
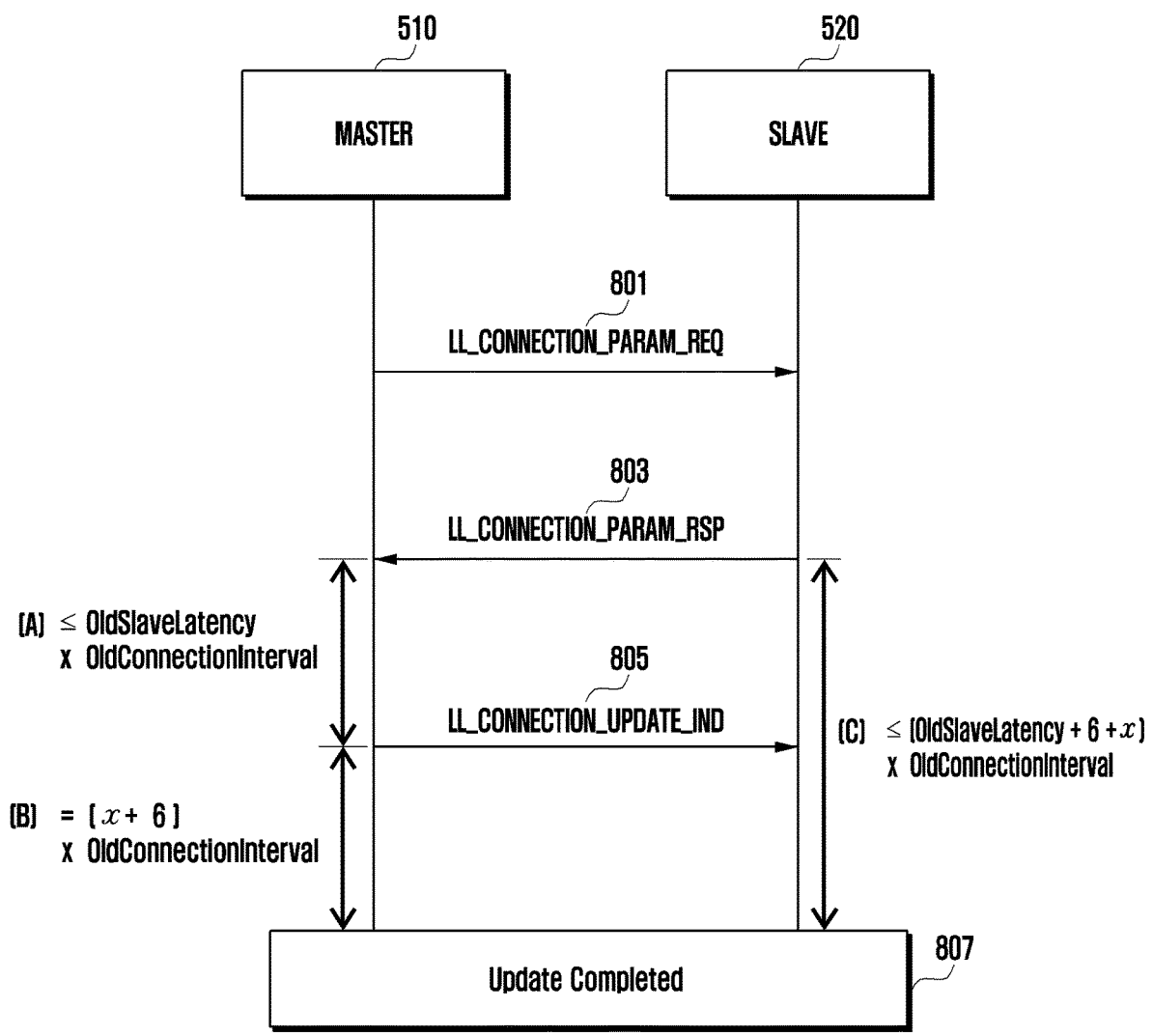
FIGS. 8A and 8B are sequence diagrams illustrating a connection update process between a master and a slave according to various embodiments of the disclosure.
Figure 8B:
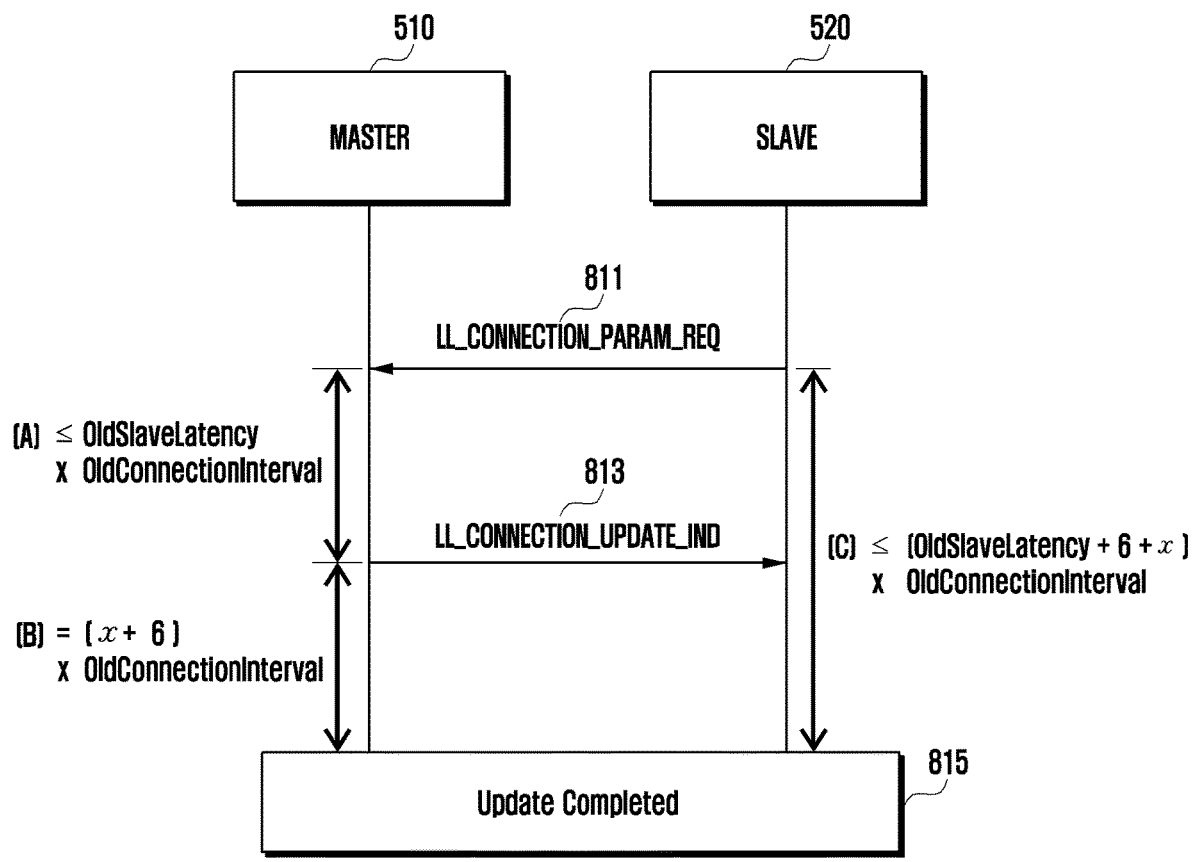

FIGS. 8A and 8B are sequence diagrams illustrating a connection update process between a master and a slave according to various embodiments of the disclosure.

FIGS. 8A and 8B may indicate an update completion operation between the master 510 and the slave 520 in the connection parameter negotiation process illustrated in FIG. 5, 6 or 7. In one embodiment, FIG. 8A shows a case in which the master 510 initiates the connection parameter negotiation process (e.g., FIG. 5 or 7) and receives a connection parameter response message (e.g., LL_CONNECTION_PARAM_RSP) from the slave 520. In one embodiment, FIG. 8B shows a case in which the slave 520 initiates the connection parameter negotiation process (e.g., FIG. 6) and transmits a connection parameter request message (e.g., LL_CONNECTION_PARAM_REQ).

Referring to FIG. 8A, at operation 801, the master 510 may transmit a connection parameter request message (e.g., LL_CONNECTION_RARAM_REQ) to the slave 520 (e.g., operation 501 in FIG. 5, or operation 705 in FIG. 7).

At operation 803, the slave 520 may transmit a connection parameter response message (e.g., LL_CONNECTION_PARAM_RSP) to the master 510 (e.g., operation 503 in FIG. 5, or operation 707 in FIG. 7). In one embodiment, based on the received connection parameter request message, the slave 520 may transmit a connection parameter response message to the master 510 when accepting (or agreeing to) the change of the connection parameters. In another embodiment, based on the received connection parameter request message, the slave 520 may transmit a connection parameter rejection message (e.g., LL_REJECT_IND or LL_REJECT_EXT_IND) to the master 510 when rejecting the change of the connection parameters.

At operation 805, the master 510 may transmit a connection update indication message (e.g., LL_CONNECTION_UPDATE_IND) to the slave 520 (e.g., operation 505 in FIG. 5, or operation 709 in FIG. 7). At operation 807, the master 510 may complete the update (e.g., update completed). For example, the master 510 may calculate the delta being a time interval between a message related to the connection parameter update (e.g., connection parameter response message) and the instant, determine the instant time point according to the calculated delta, and transmit the connection update indication message including the determined instant time point to the slave 520.

Referring to FIG. 8B, at operation 811, the slave 520 may transmit a connection parameter request message (e.g., LL_CONNECTION_RARAM_REQ) to the master 510 (e.g., operation 601 in FIG. 6). In one embodiment, the slave 520 may transmit a connection parameter request message to the master 510 as described with reference to FIG. 6.

At operation 813, the master 510 may transmit a connection update indication message to the slave 520. At operation 815, the master 510 may complete the update (e.g., update completed). For example, the master 510 may calculate the delta being a time interval between a message related to the connection parameter update (e.g., connection parameter request message) and the instant, determine the instant time point according to the calculated delta, and transmit the connection update indication message including the determined instant time point to the slave 520.

In one embodiment, based on the connection parameter request message received from the slave 520, the master 510 may identify the target slave 520 that has transmitted the connection parameter request message. For example, the master 510 can identify whether the slave 520 having transmitted the connection parameter request message is a designated (or pre-agreed) slave capable of supporting an adaptive connection update of various embodiments. In one embodiment, the master 510 may identify the slave 520 based on identification information (e.g., device ID) of the slave 520.

In one embodiment, if the slave 520 having transmitted the connection parameter request message is a designated slave, the master 510 may calculate the delta, which is a time interval between the message related to a connection parameter update (e.g., connection parameter request message) and the instant, based on the first designated scheme. For example, the master 510 may calculate the delta based on the first designated scheme and determine the time point of the instant according to the calculated delta. In one embodiment, if the slave 520 having transmitted the connection parameter request message is not a designated slave, the master 510 may calculate the delta, which is a time interval between the message related to a connection parameter update (e.g., connection parameter request message) and the instant, based on the second designated scheme. For example, the master 510 may calculate the delta based on the second designated scheme and determine the time point of the instant according to the calculated delta. In another embodiment, when the master 510 rejects the connection parameter request message from the slave 520, the master 510 may transmit a rejection message (e.g., LL_REJECT_IND or LL_REJECT_EXT_IND) other than a connection update indication message to the slave 520, in which case the corresponding process may be terminated.

The embodiment in FIGS. 8A and 8B may show an example of a process based on the second designated scheme.

According to the embodiment of FIGS. 8A and 8B, regardless of the entity initiating the connection parameter negotiation process (e.g., master 510 or slave 520), the first connection event where the changed values are applied may occur after a total time (e.g., interval (C)) given by the sum of the slave latency delay (e.g., interval (A)) taking into account one time the existing slave latency (e.g., OldSlaveLatency) and the time at least 6 times longer than the existing connection event (e.g., interval (B)). In this way, the point in time at which the first connection event where the changed values are applied occurs may be referred to as the instant. The instant may be included in a connection update indication message at the link layer by the master 510 and transmitted to the slave 520. When the time interval (e.g., interval (C) in FIG. 8A or 8B) between a message related to the connection parameter update (e.g., connection parameter response message (in FIG. 8A) or connection parameter request message (in FIG. 8B)) and the instant is referred to as the delta, the delta can be represented as Equation 1 below.

$$SlaveLatencyDelay \leq$$
$$OldSlaveLatency \times OldConnectionIntervalDelta \leq$$
$$SlaveLatency + (x+6) \times OldConnectionInterval =$$
$$(OldSlaveLatency + 6 + x) \times OldConnectionInterval$$

Equation 1

In Equation 1, OldSlaveLatency indicates the existing (old) value of the slave latency, OldConnectionInterval indicates the existing (old) value of the connection interval, SlaveLatencyDelay indicates the slave latency delay taking account of the time corresponding to the existing value of the slave latency, and x is an integer value greater than or equal to 0 and may be determined by the master 510.

In one embodiment, the master 510 may calculate the delta being a time interval between a message related to the connection parameter update (e.g., connection parameter response message (in FIG. 8A) or connection parameter request message (in FIG. 8B) and the instant, determine the instant time point according to the calculated delta, and transmit a connection update indication message including the determined instant time point to the slave 520. For example, the master 510 may include, not the value of interval (A) and/or interval (B) (e.g. delta), but the instant time point taking account of interval (A) and interval (B) (e.g. instant time point taking account of the delta), for example, the time point of the connection event where the update is completed (update completed) in the connection update indication message. In one embodiment, the instant may be represented in terms of, for example, a connection event number other than time, and may mean that the connection update is completed when a connection event with the indicated number occurs.

In the embodiment of FIGS. 8A and/or 8B, the master 510 takes account of interval (A) because the slave 520 may make a reception (Rx) attempt after the maximum slave latency. This may indicate that the master 510 awaits the slave 520 for interval (A).

In one embodiment, when rapid data exchange is required between two devices connected via BLE (e.g., master 510 and slave 520), it is necessary to dynamically change the preset values of the connection parameters such as the connection interval and slave latency. For example, various situations may be specified as in the embodiments of in FIGS. 5 to 7, and when such a situation occurs, the values of the connection parameters such as the connection interval and slave latency can be dynamically changed. Meanwhile, when dynamically changing the values of the connection parameters such as the connection interval and slave latency, it may take a few seconds or more for the instant to occur for connection parameter adjustment depending on the magnitude of the existing values of the connection interval (OldConnectionInterval) and the slave latency (OldSlaveLatency).

According to various embodiments, by advancing the time point of the instant when dynamically changing the connection parameter values between two devices connected via BLE, it is possible to shorten the time from when the need for connection parameter adjustment is recognized to when the adjustment is actually applied.

Figure 9A:
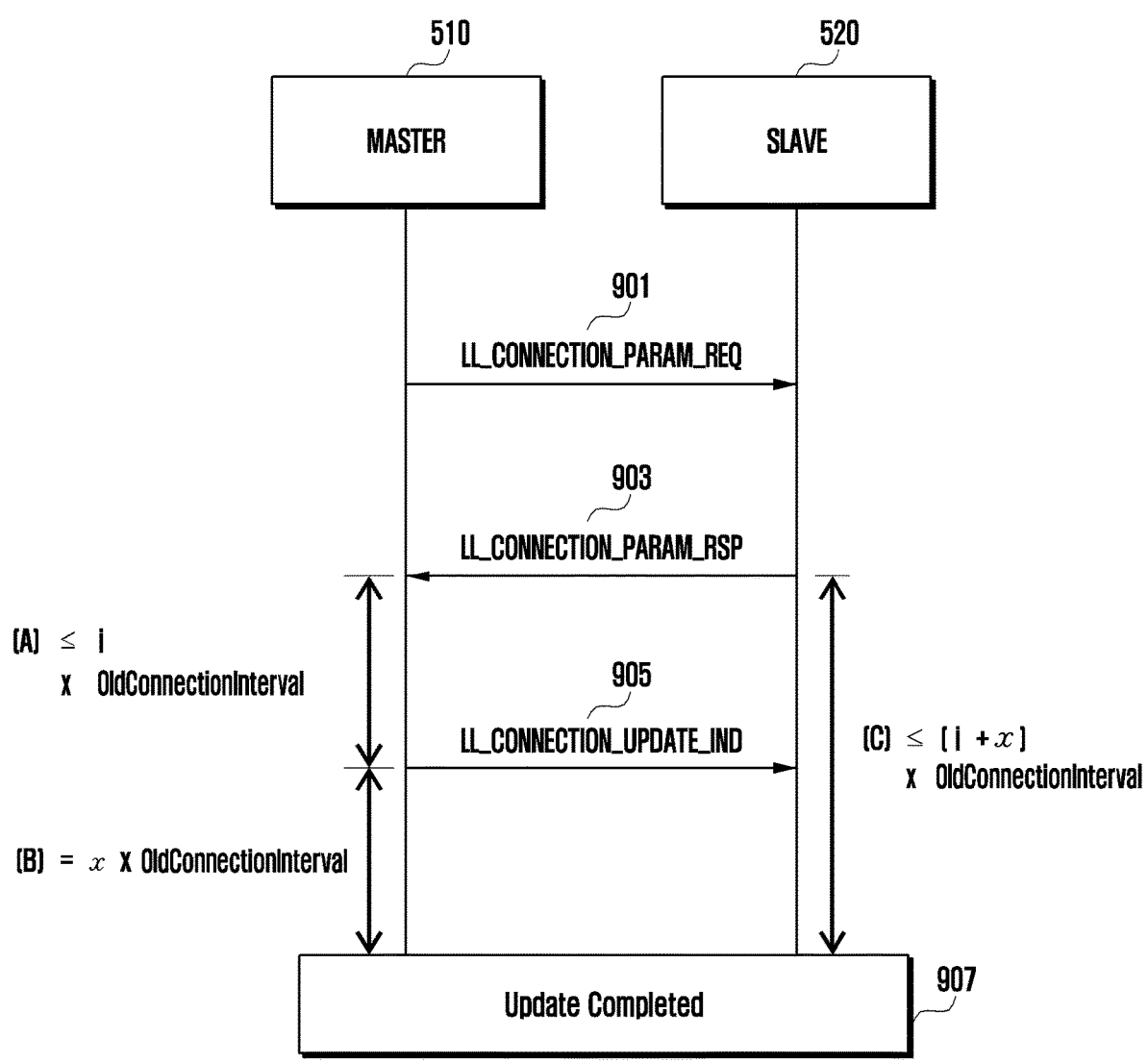
FIGS. 9A and 9B are sequence diagrams illustrating a connection update process between a master and a slave according to various embodiments of the disclosure.
Figure 9B:
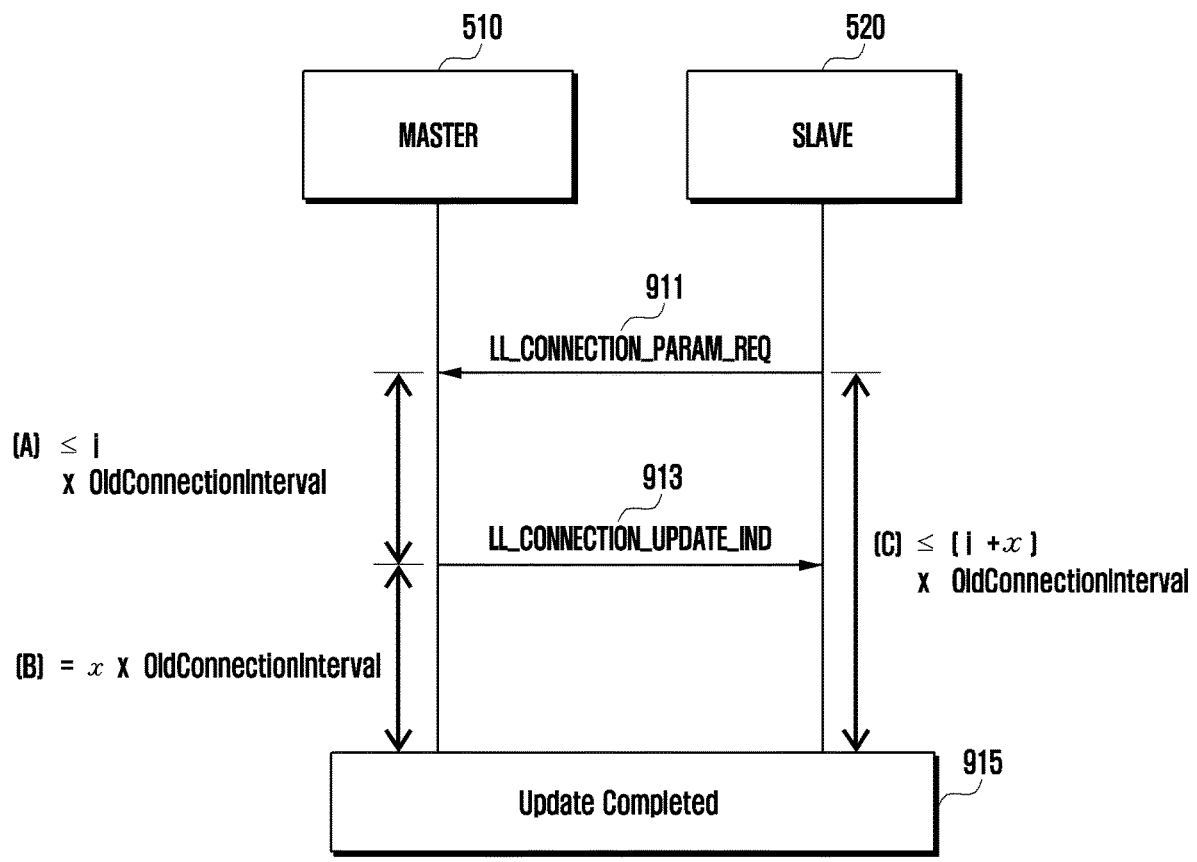

FIGS. 9A and 9B are sequence diagrams illustrating a connection update process between a master and a slave according to various embodiments of the disclosure.

FIGS. 9A and 9B may indicate an update completion operation between the master 510 (e.g., electronic device 101 in FIG. 1 or 2) and the slave 520 (e.g., digital pen 201 in FIG. 2 or 3) in the connection parameter negotiation process shown in FIG. 5, 6 or 7. In one embodiment, FIG. 9A illustrates a case where the master 510 initiates the connection parameter negotiation process (e.g., FIG. 5 or 7) and receives a connection parameter response message (e.g., LL_CONNECTION_PARAM_RSP) from the slave 520. In one embodiment, FIG. 9B illustrates a case where the slave 520 initiates the connection parameter negotiation process (e.g., FIG. 6) and transmits a connection parameter request message (e.g., LL_CONNECTION_PARAM_REQ).

Referring to FIG. 9A, at operation 901, the master 510 may transmit a connection parameter request message (e.g., LL_CONNECTION_RARAM_REQ) to the slave 520 (e.g., operation 501 in FIG. 5 or operation 705 in FIG. 7).

At operation 903, the slave 520 may transmit a connection parameter response message (e.g., LL_CONNECTION_PARAM_RSP) to the master 510 (e.g., operation 503 in FIG. 5 or operation 707 in FIG. 7). In one embodiment, based on the received connection parameter request message, the slave 520 may transmit a connection parameter response message to the master 510 when accepting (or agreeing to) the change of the connection parameters. In another embodiment, based on the received connection parameter request message, the slave 520 may transmit a connection parameter rejection message (e.g., LL_REJECT_IND or LL_REJECT_EXT_IND) to the master 510 when rejecting the change of the connection parameters.

At operation 905, the master 510 may transmit a connection update indication message (e.g., LL_CONNECTION_UPDATE_IND) to the slave 520 (e.g., operation 505 in FIG. 5 or operation 709 in FIG. 7). At operation 907, the master 510 may complete the update (e.g., update completed). For example, the master 510 may calculate the delta being a time interval between a message related to the connection parameter update (e.g., connection parameter response message) and the instant, determine the instant time point according to the calculated delta, and transmit the connection update indication message including the determined instant time point to the slave 520.

Referring to FIG. 9B, at operation 911, the slave 520 may transmit a connection parameter request message (e.g., LL_CONNECTION_RARAM_REQ) to the master 510 (e.g., operation 601 in FIG. 6). In one embodiment, the slave 520 may transmit the connection parameter request message to the master 510 as described with reference to FIG. 6.

At operation 913, the master 510 may transmit a connection update indication message to the slave 520. At operation 915, the master 510 may complete the update (e.g., update completed). For example, the master 510 may calculate the delta being a time interval between a message related to the connection parameter update (e.g., connection parameter request message) and the instant, determine the instant time point according to the calculated delta, and transmit the connection update indication message including the determined instant time point to the slave 520.

In one embodiment, based on the connection parameter request message received from the slave 520, the master 510 may identify the target slave 520 that has transmitted the connection parameter request message. For example, the master 510 can identify whether the slave 520 having transmitted the connection parameter request message is a designated (or pre-agreed) slave capable of supporting an adaptive connection update of various embodiments. In one embodiment, the master 510 may identify the slave 520 based on identification information (e.g., device ID) of the slave 520.

In one embodiment, if the slave 520 having transmitted the connection parameter request message is a designated slave, the master 510 may calculate the delta, which is a time interval between the message related to a connection parameter update (e.g., connection parameter request message) and the instant, based on the first designated scheme. For example, the master 510 may calculate the delta based on the first designated scheme and determine the time point of the instant according to the calculated delta. In one embodiment, if the slave 520 having transmitted the connection parameter request message is not a designated slave, the master 510 may calculate the delta, which is a time interval between the message related to a connection parameter update (e.g., connection parameter request message) and the instant, based on the second designated scheme. For example, the master 510 may calculate the delta based on the second designated scheme and determine the time point of the instant according to the calculated delta. In another embodiment, when the master 510 rejects the connection parameter request message from the slave 520, the master 510 may transmit a rejection message (e.g., LL_REJECT_IND or LL_REJECT_EXT_IND) other than a connection update indication message to the slave 520, in which case the corresponding process may be terminated.

The embodiment in FIGS. 9A and 9B may show an example of a process based on the first designated scheme.

According to the embodiment in FIG. 9A or 9B, the master 510 may transmit the slave 520 a connection update indication message including connection parameter values determined (or changed) based on the connection parameter negotiation. In various embodiments, when the master 510 and the slave 520 are connected via BLE, the connection parameter negotiation process may be started based on a preset event (e.g., designated event) between the two devices 510 and 520. In one embodiment, there may be various designated events. For example, the designated event may correspond to an action of the user manipulating a specific button of the master 510 or the slave 520 or to an action of the user physically separating apart the two devices that are physically in contact or close together.

In various embodiments, at least one of the master 510 (e.g., electronic device 101 of FIG. 1 or 2) or the slave 520 (e.g., digital pen 201 in FIG. 2 or 3) connected via BLE may recognize a situation where the value of one or more connection parameters (e.g., connection interval and slave latency) need to be changed (hereinafter, referred to as a designated event). In various embodiments, the device (e.g., master and/or slave) having recognized a designated event related to the connection parameters may transmit a connection parameter request message (e.g., LL_CONNECTION_PARAM_REQ) including desired connection parameter values to the counterpart device.

In one embodiment, the master 510 and the slave 520 may complete the update. In one embodiment, after receiving the connection update indication message, the slave 520 may make a reception (Rx) attempt with an interval (e.g., interval i) less than or equal to the existing value of the slave latency (e.g., OldSlaveLatency) and having an integer value greater than or equal to 0. In various embodiments, the master 510 may know in advance the value of the corresponding interval (e.g., interval i) of the slave 520. For example, the master 510 may check the value of the interval of the slave 520 based on the generic attribute profile (GATT) database query defined by the Bluetooth specification during the existing connection with the slave 520. In various embodiments, when the time interval between a message related to the connection parameter update (e.g., connection parameter response message (in FIG. 9A) or connection parameter request message (in FIG. 9B)) and the instant (e.g., interval (C) in FIG. 9A or 9B) is referred to as the delta, to advance the occurrence time of the instant, the delta may be redefined as in Equation 2 below.

$$SlaveLatencyDelay \leq i \times OldConnectionIntervalDelta \leq$$
$$SlaveLatency + x \times OldConnectionInterval =$$
$$(i + x) \times OldConnectionInterval$$

Equation 2

In Equation 2, i indicates the interval at which the slave 520 opens the reception (Rx) (e.g., interval i), OldConnectionInterval indicates the existing (old) value of the connection interval, SlaveLatencyDelay indicates the slave latency delay taking account of the time corresponding to the interval (e.g., interval i) of the slave 520, and x is an integer value greater than or equal to 0 and may be determined by the master 510.

In one embodiment, the master 510 may calculate the delta being a time interval between a message related to the connection parameter update (e.g., connection parameter response message (LL_CONNECTION_PARAM_RSP in FIG. 8A) or connection parameter request message (LL_CONNECTION_PARAM_REQ in FIG. 8B)) and the instant, determine the instant time point according to the calculated delta, and transmit a connection update indication message including the determined instant time point to the slave 520. For example, the master 510 may include, not the value of interval (A) and/or interval (B) (e.g., delta), but the instant time point taking account of interval (A) and interval (B) (e.g. instant time point taking account of the delta), for example, the time point of the connection event where the update is completed (update completed) in the connection update indication message. In one embodiment, the instant may be represented in terms of, for example, a connection event number other than time, and may mean that the connection update is completed when a connection event with the indicated number occurs.

In the embodiment of FIGS. 9A and/or 9B, the master 510 takes account of interval (A) because the slave 520 may make a reception (Rx) attempt after the maximum slave latency. This may indicate that the master 510 awaits the slave 520 for interval (A).

In various embodiments, after receiving the connection update indication message (e.g., LL_CONNECTION_UPDATE_IND), the slave 520 may make a reception (Rx) attempt with an interval less than or equal to the existing slave latency. In various embodiments, the master 510 may determine that the slave 520 is a device operable according to various embodiments (e.g., slave satisfying a specified condition), and calculate a delta less than the previous delta based on the corresponding interval value of the slave 520 at the same time, thereby advancing the time point of the instant compared with the existing one.

In various embodiments, the connection parameter negotiation process may be classified according to which of the master 510 and the slave 520 transmits a connection parameter request message (e.g., LL_CONNECTION_PARAM_REQ).

Figure 10:
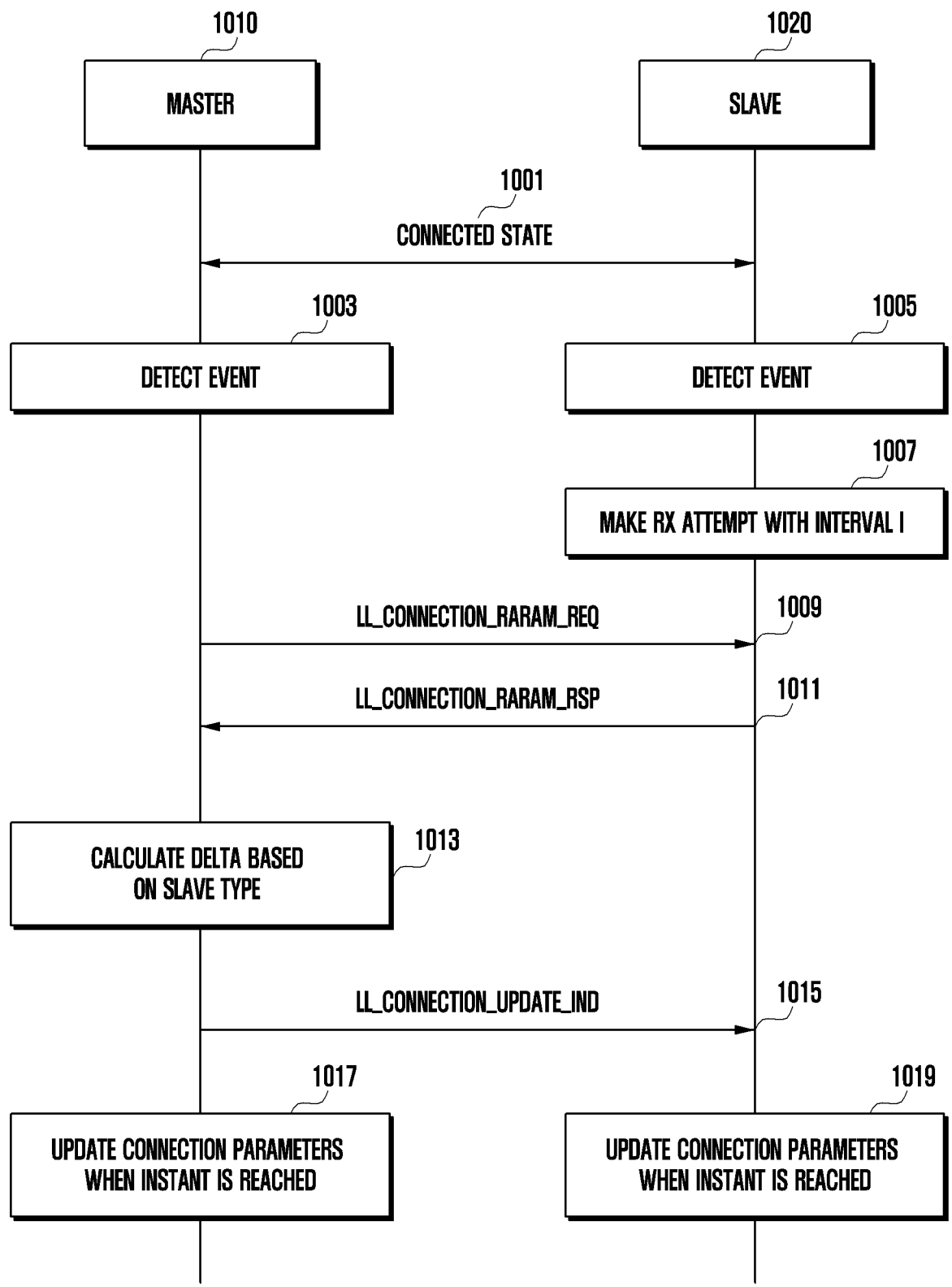
FIG. 10 is a sequence diagram illustrating an adaptive connection update process initiated by a master according to an embodiment of the disclosure.

FIG. 10 is a sequence diagram illustrating an adaptive connection update process initiated by a master according to an embodiment of the disclosure.

The embodiment of FIG. 10 illustrates a case where a master (e.g., electronic device 101 in FIG. 1 or 2) transmits a connection parameter request message (e.g., LL_CONNECTION_PARAM_REQ) to a slave (e.g., digital pen 201 in FIG. 2 or 3). In other words, FIG. 10 illustrates an example of performing an adaptive connection update initiated by the master.

Referring to FIG. 10, at operation 1001, a master 1010 and a slave 1020 may be in the connected state. For example, the master 1010 and the slave 1020 may be connected via BLE communication and remain in a standby state.

At operation 1003 or operation 1005, the master 1010 or the slave 1020 may detect a predefined event (or, designated event). In one embodiment, a predefined event may occur when the slave 1020 is separated from the master 1010. In one embodiment, a predefined event may occur when a designated application (e.g., application related to execution of a specific function using the slave 1020 (e.g., drawing function or mouse function)) is executed in the master 1010. In one embodiment, a predefined event may occur when a specific operation (e.g., function based on the button of the slave 1010) is executed (or detected) in the slave 1020.

In one embodiment, the event can be detected by either the master 1010 or the slave 1020. In another embodiment, the event may be detected almost simultaneously by both the master 1010 and the slave 1020. When the event is detected by both the master 1010 and the slave 1020 almost at the same time, the event may be processed based on at least the following operations. For example, if the connection parameter request procedure has already started due to the time difference in detecting the event between the master 1010 and the slave 1020, both the master 1010 and the slave 1020 may not transmit an additional connection parameter request until the corresponding procedure is completed. As another example, if the master 1010 or the slave 1020 receives a connection parameter request message after the connection parameter request procedure has started, the connection may be released. For example, if the master 1010 receives a connection parameter request message, the master 1010 may reject (or release) the connection by transmitting a connection rejection message (e.g., LL_REJECT_IND or LL_REJECT_EXT_IND). For example, if the slave 1020 receives a connection parameter request message, the slave 1020 may terminate the existing slave-initiated procedure (e.g., slave-initiated connection parameter request procedure for connection parameter negotiation), and may restart the connection parameter negotiation based on the master-initiated procedure (e.g., master-initiated connection parameters request procedure for connection parameter negotiation).

At operation 1007, the slave 1020 may make a reception (Rx) attempt based on the interval of a designated value (e.g., interval i). For example, upon detection of the event, the slave 1020 may make a reception attempt based on an interval value within the slave latency predefined between the master 1010 and the slave 1020. In one embodiment, the slave 1020 may open (or make an attempt) the reception (Rx) based on the slave latency. In one embodiment, if an event is detected at operation 1005, the slave 1020 may open (or make an attempt) the reception (Rx) based on a designated interval value (e.g., interval i) being a period shorter than the slave latency (e.g., interval less than or equal to the slave latency) in response to the event detection. In one embodiment, the slave 1020 may improve the update speed in comparison to the power consumed for reception by making a reception attempt based on the designated interval value only when the corresponding event occurs. In one embodiment, the slave 1020 may make a reception (Rx) attempt with an interval less than or equal to the slave latency to reduce power consumption in normal situations.

In one embodiment, when a designated event is detected, the slave 1020 may make a reception attempt with an interval i to improve the update speed by using the interval i less than or equal to the slave latency instead of the slave latency. In one embodiment, the interval i may include a value of 0 or more (e.g., i≥0). In another embodiment, the slave 1020 may replace the slave latency with an interval i less than or equal to the slave latency to improve the update speed. For example, the connection interval may be in units of time, the slave latency may be in units of number of times, and the interval i may be a replacement for the slave latency. In one embodiment, the time interval at which the slave 1020 opens the reception (Rx) may be represented as, for example, "time interval=connection interval×z≤connection interval×slave latency", where the value of z may be optionally determined by the slave 1020.

At operation 1009, based on the detected event, the master 1010 may include desired change values for the connection parameters (e.g., connection interval and slave latency) in a connection parameter request message (e.g., LL_CONNECTION_PARAM_REQ) and transmit the message to the slave 1020. In the embodiment of FIG. 10, operation 1007 and operation 1009 may be performed in sequence, in parallel, or in reverse sequence.

Upon receiving the connection parameter request message from the master 1010, at operation 1011, the slave 1020 may transmit the master 1010 a connection parameter response message (e.g., LL_CONNECTION_PARAM_RSP) corresponding to the connection parameter request message. In one embodiment, upon receiving a connection parameter request from the master 1010, the slave 1020 may provide the master 1010 with a response to apply the values of the connection interval and slave latency changed by the master 1010 according to the connection parameter request message. In another embodiment, when the slave 1020 rejects the application of the values of the connection interval and the slave latency changed by the master 1010 according to the connection parameter request message, the slave 1020 may transmit a rejection message (e.g., LL_REJECT_IND or LL_REJECT_EXT_IND) other than a connection parameter response message to the master 1010, in which case the corresponding process may be terminated without transmission of a connection update indication message by the master 1010.

At operation 1013, the master 1010 may calculate the delta based on the type of the slave. In one embodiment, upon receiving a connection parameter response message from the slave 1020, the master 1010 may identify the target slave 1020 that has transmitted the connection parameter response message based on the received connection parameter response message. In one embodiment, the master 1010 may identify the type of the slave 1020 based on the identification information (e.g., device ID) of the slave 1020 obtained from the values carried in an advertising packet received during an advertising operation before the connection is made with the slave 1020. For example, the master 1010 can identify whether the slave 1020 having transmitted the connection parameter response message is a designated (or pre-agreed) slave capable of supporting an adaptive connection update of various embodiments.

In one embodiment, the master 1010 may identify the device attribute (e.g., mobile phone, pen, or earphone) of the slave 1020 based on identification information of the slave 1020. In one embodiment, the master 1010 and the slave 1020 may know each other's device attribute at the time of making the connection, and the identification information of the slave 1020 may be managed (or stored) in a lookup table for the device attribute. In various embodiments, the operation of identifying the slave 1020 may be an operation of checking the already known device attribute of the slave 1020. In one embodiment, during an advertising operation before the connection is made between the master 1010 and the slave 1020 (e.g., advertiser and scanner group operation), the advertiser may use a pre-agreed value (or, value different from that specified in the specification) for the packet data unit (PDU) type in an advertising packet. The scanner can identify whether the advertiser performing an advertisement is an advertiser satisfying a specified condition. Thereafter, when transitioning to the connected state (e.g., connected as a master and a slave), the corresponding scanner may be changed into a master, and the corresponding advertiser may be changed into a slave. Then, the master can determine whether the slave satisfies the specified condition based on the device attribute of the slave.

In one embodiment, the master 1010 may selectively use the first designated scheme or the second designated scheme based on at least the status information of the master 1010 or slave 1020 or additional information of the event. For example, when the master 1010 is connected to the slave 1020 supporting the first designated scheme and the second designated scheme, the master 1010 may check the specified condition (e.g., status information of the master 1010 or slave 1020, or additional information of the event) and operate in a fast mode, or may preferentially use the first designated scheme if a specific event type is configured.

In one embodiment, if the slave 1020 is identified to be a designated slave, the master 1010 may calculate the delta, which is a time interval between the connection update indication message and the instant, based on the first designated scheme (e.g., delta calculation using Equation 2) (e.g., FIG. 9A). For example, the master 1010 may calculate the delta based on the first designated scheme and determine the time point of the instant according to the calculated delta. In one embodiment, if the slave 1020 is identified to be a non-designated slave, the master 1010 may calculate the delta, which is a time interval between the connection update indication message and the instant, based on the second designated scheme (e.g., delta calculation using Equation 1) (e.g., FIG. 8A). For example, the master 1010 may calculate the delta based on the second designated scheme and determine the time point of the instant according to the calculated delta.

At operation 1015, the master 1010 may specify the instant based on the calculated delta and then transmit a connection update indication message (e.g., LL_CONNECTION_UPDATE_IND) including the specified instant value to the slave 1020. In one embodiment, the master 1010 may calculate the delta being a time interval between the connection update indication message and the instant, determine the time point of the instant according to the calculated delta, and transmit a connection update indication message including the determined instant time point to the slave 1020.

When the instant is reached, at operation 1017 (at operation 1019), the master 1010 (the slave 1020) may update the connection parameters. In one embodiment, the master 1010 and the slave 1020 may monitor the designated instant according to the instant time point included in the connection update indication message, and may update the connection parameters including the connection interval and/or the slave latency when the corresponding instant is reached. The connection parameters may include various parameters related to the connection, such as the connection interval, slave latency, and/or timeout. In one embodiment, the timeout may be a criterion for determining release (or disconnection) of the connection when there is no response between the master 1010 and the slave 1020. In various embodiments, the connection parameter request procedure (or connection parameter negotiation process) may include changing one or more connection parameters, and may update various connection parameters including the connection interval and slave latency. For example, the master 1010 may change the connection interval only or may simultaneously change a combination of one or more connection parameters such as the connection interval, the slave latency, and the timeout by use of the connection parameter request procedure.

Figure 11:
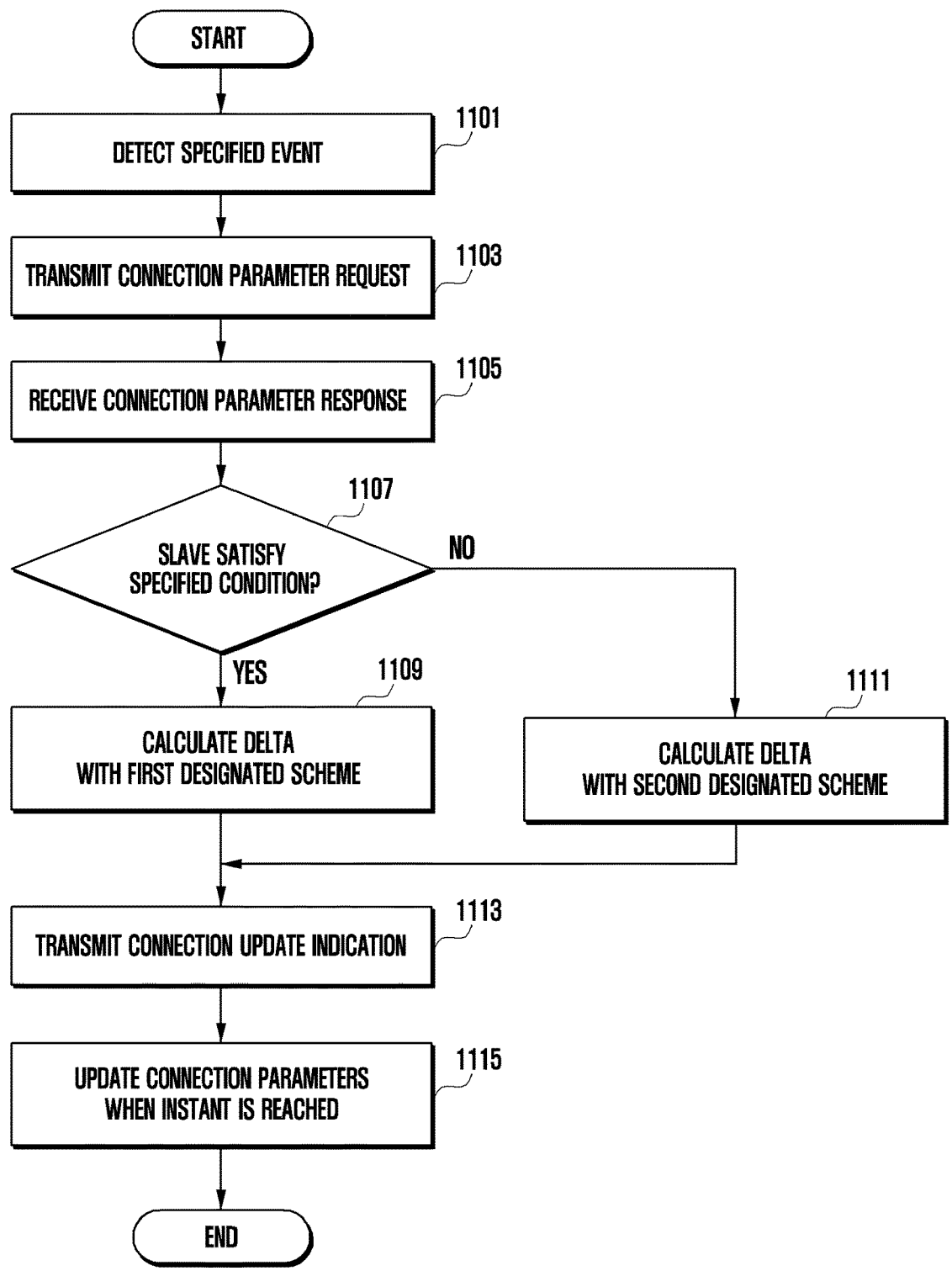
FIG. 11 is a flowchart illustrating an adaptive connection update method of a master according to an embodiment of the disclosure.

FIG. 11 is a flowchart illustrating an adaptive connection update method of a master according to an embodiment of the disclosure.

The embodiment of FIG. 11 illustrates operations of the master 1010 (e.g., electronic device 101 in FIG. 1 or 2) transmitting a connection parameter request message to the slave 1020 (e.g., digital pen 201 in FIG. 2 or 3). The operations of the master 1010 according to the embodiment of FIG. 11 may be executed by at least one processor (e.g., processor 120) of the electronic device 101 of FIG. 1 (e.g., at least one processor including processing circuits). In one embodiment, the operations of the master 1010 may be implemented as instructions that are stored in the memory (e.g., memory 130 in FIG. 1) of the electronic device 101 and cause, when executed, the processor 120 to operate.

Referring to FIG. 11, at operation 1101, the processor (e.g., processor 120) of the master 1010 may detect a predefined event. In one embodiment, the processor 120 may monitor a designated event related to execution of a designated function of the slave 1020 while the master 1010 and the slave 1020 are connected to each other. In one embodiment, predefined (or designated) events may include an event associated with separation of the slave 1020 from the master 1010, an event associated with execution of a designated application (e.g., application related to execution of a specific function using the slave 1020 (e.g., drawing function or mouse function)) in the master 1010, or an event associated with execution (or detection) of a specific operation (e.g., function based on the button of the slave 1010) in the slave 1020.

At operation 1103, based on the detected event, the processor 120 may include desired change values for the connection interval and slave latency in a connection parameter request message (e.g., LL_CONNECTION_PARAM_REQ) and transmit the message through a communication circuit (e.g., wireless communication module 192 in FIG. 1) to the slave 1020. In one embodiment, the processor 120 may transmit the connection parameter request message to the slave 1020 through a communication channel connected to the slave 1020.

At operation 1105, the processor 120 may receive a connection parameter response message from the slave 1020. In one embodiment, the processor 120 may use the communication circuit to receive a connection parameter response message corresponding to the connection parameter request message from a nearby slave 1020 connected (or communicable) through BLE communication. In another embodiment, when the slave 1020 rejects the change of the connection parameters according to the connection parameter request message, the slave 1020 may transmit a rejection message (e.g., LL_REJECT_IND or LL_REJECT_EXT_IND) other than a connection parameter response message to the master 1010, in which case the corresponding process may be terminated without transmission of a connection update indication message by the master 1010.

At operation 1107, the processor 120 may determine whether the slave 1020 is a slave satisfying a specified condition. In one embodiment, the processor 120 can identify whether the slave 1020 having transmitted the connection parameter response message is a designated (or pre-agreed) slave capable of supporting an adaptive connection update of various embodiments. In one embodiment, the processor 120 may identify the target slave 1020 that has transmitted the connection parameter response message based on the received connection parameter response message. In one embodiment, the processor 120 (e.g., master 1010) may identify the type of the slave 1020 based on the identification information (e.g., device ID) of the slave 1020 obtained from the values carried in an advertising packet received during an advertising operation before the connection is made with the slave 1020. In one embodiment, the processor 120 may identify the device attribute (e.g., mobile phone, pen, or earphone) of the slave 1020 based on identification information of the slave 1020. In one embodiment, the master 1010 and the slave 1020 may know each other's device attribute at the time of making the connection, and the identification information of the slave 1020 may be managed (or stored) in a lookup table for the device attribute. In various embodiments, the operation of identifying the slave 1020 may be an operation of checking the already known device attribute of the slave 1020. In one embodiment, during an advertising operation before the connection is made between the master 1010 and the slave 1020 (e.g., advertiser and scanner group operation), the advertiser may use a pre-agreed value (or, value different from that specified in the specification) for the PDU type in an advertising packet. The scanner can identify whether the advertiser performing an advertisement is an advertiser satisfying a specified condition. Thereafter, when transitioning to the connected state (e.g., connected as a master and a slave), the corresponding scanner may be changed into a master, and the corresponding advertiser may be changed into a slave. Then, the master can determine whether the slave satisfies the specified condition based on the device attribute of the slave.

In various embodiments, execution of operation 1107 for determination may be skipped. In one embodiment, the processor 120 (e.g., master 1010) may proceed from operation 1105 directly to operation 1109 without checking the condition of the slave 1020, and perform operation 1109 and subsequent operations based on, for example, a user need for rapid connection.

In various embodiments, the processor 120 may selectively use the first designated scheme or the second designated scheme based on at least the status information of the master 1010 or slave 1020 or additional information of the event. For example, when the master 1010 is connected to the slave 1020 supporting the first designated scheme and the second designated scheme, the processor 120 may check the specified condition (e.g., status information of the master 1010 or slave 1020, or additional information of the event) and operate in a fast mode, or may preferentially use the first designated scheme if a specific event type is configured.

Upon determining that the slave 1020 is a slave satisfying the specified condition (e.g., yes-branch at operation 1107), at operation 1109, the processor 120 may calculate the delta, which is a time interval between a message related to the connection parameter update (e.g., connection parameter response message) and the instant, based on the first designated scheme. In one embodiment, the first designated scheme may correspond to delta calculation using Equation 2.

Upon determining that the slave 1020 is not a slave satisfying the specified condition (e.g., no-branch at operation 1107), at operation 1111, the processor 120 may calculate the delta, which is a time interval between a message related to the connection parameter update (e.g., connection parameter response message) and the instant, based on the second designated scheme. In one embodiment, the second designated scheme may correspond to delta calculation using Equation 1.

At operation 1113, the processor 120 may specify the instant based on the calculated delta and then transmit a connection update indication message including the specified instant value to the slave 1020 through the communication circuit.

When the instant is reached, at operation 1115, the processor 120 may update the connection parameters. In one embodiment, the processor 120 may monitor the designated instant according to the instant time point included in the connection update indication message, and may update the connection parameters including the connection interval and/or the slave latency when the corresponding instant is reached. In one embodiment, the connection parameters may include various parameters related to the connection, such as the connection interval, slave latency, and/or timeout. In one embodiment, the timeout may be a criterion for determining release (or disconnection) of the connection when there is no response between the master 1010 and the slave 1020. In various embodiments, the connection parameter request procedure (or connection parameter negotiation process) may include changing one or more connection parameters, and may update various connection parameters including the connection interval and slave latency. For example, the master 1010 may change the connection interval only or may simultaneously change a combination of one or more connection parameters such as the connection interval, the slave latency, and the timeout by use of the connection parameter request procedure.

Figure 12:
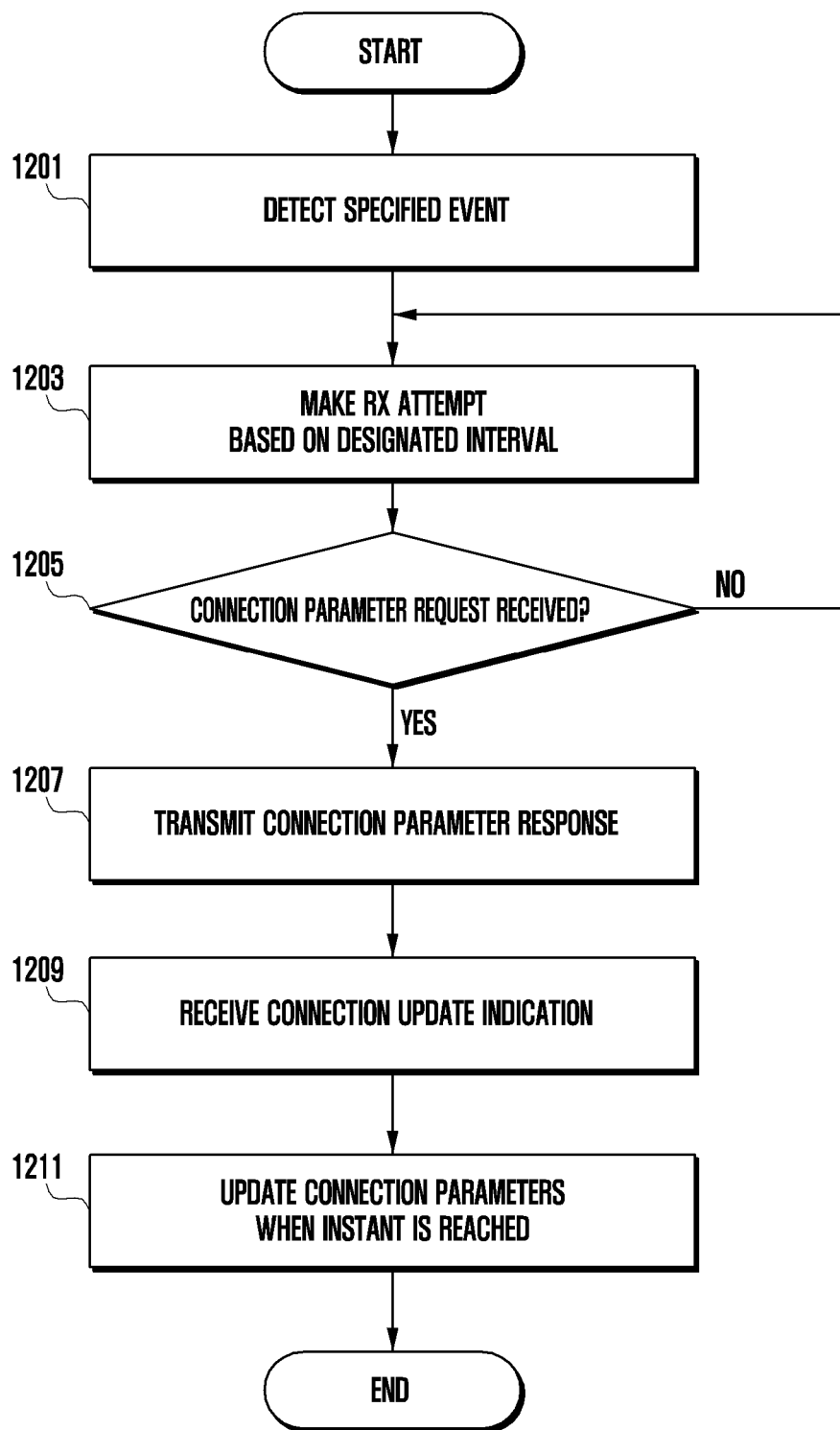
FIG. 12 is a flowchart illustrating an adaptive connection update method of a slave according to an embodiment of the disclosure.

FIG. 12 is a flowchart illustrating an adaptive connection update method of a slave according to an embodiment of the disclosure.

The embodiment of FIG. 12 illustrates operations of the slave 1020 (e.g., digital pen 201 in FIG. 2 or 3) when the master 1010 (e.g., electronic device 101 in FIG. 1 or 2) transmits a connection parameter request message to the slave 1020. The operations of the slave 1020 according to the embodiment of FIG. 12 may be executed by at least one processor (e.g., processor 320) of, for example, the digital pen 201 of FIG. 3 (e.g., at least one processor including processing circuits). In one embodiment, the operations of the slave 1020 may be implemented as instructions that are stored in the memory (e.g., memory 330 in FIG. 1) of the digital pen 201 and cause, when executed, the processor 320 to operate.

Referring to FIG. 12, at operation 1201, the processor (e.g., processor 320) of the slave 1020 may detect a predefined event. In one embodiment, the processor 320 may monitor a designated event related to execution of a designated function of the slave 1020 while the master 1010 and the slave 1020 are connected to each other. In one embodiment, predefined (or designated) events may include an event associated with separation of the slave 1020 from the master 1010, an event associated with execution of a designated application (e.g., application related to execution of a specific function using the slave 1020 (e.g., drawing function or mouse function)) in the master 1010, or an event associated with execution (or detection) of a specific operation (e.g., function based on the button of the slave 1010) in the slave 1020.

At operation 1203, the processor 320 may make a reception (Rx) attempt based on the interval of a designated value (e.g., interval i). For example, upon detection of the event, the processor 320 may attempt to receive a connection parameter request message from the master 1010 based on an interval value within the slave latency predefined between the master 1010 and the slave 1020. In one embodiment, the processor 320 may open (or make an attempt) the reception (Rx) based on the slave latency. In one embodiment, if a designated event is detected at operation 1201, the processor 320 may make a reception (Rx) attempt based on a designated interval value (e.g., interval i) being a period shorter than the slave latency (e.g., interval less than or equal to the slave latency) in response to the event detection. In one embodiment, the processor 320 may improve the update speed by making a reception attempt based on the designated interval value only when the corresponding event occurs. In one embodiment, the processor 320 (e.g., slave 1020) may make a reception (Rx) attempt with an interval less than or equal to the slave latency to reduce power consumption in normal situations. In one embodiment, when a designated event is detected, the processor 320 may make a reception attempt with an interval i to improve the update speed by using the interval i less than or equal to the slave latency instead of the slave latency. In one embodiment, the interval i may include a value of 0 or more (e.g., i≥0).

At operation 1205, the processor 320 may determine whether a connection parameter request message (e.g., LL_CONNECTION_PARAM_REQ) including change values for the connection interval and slave latency is received from the master 1010. In the embodiment of FIG. 12, operation 1203 and operation 1205 may be performed in sequence, in parallel, or in reverse sequence.

Upon determining that a connection parameter request message is not received from the master 1010 (e.g., no-branch at operation 1205), the procedure may return to operation 1203.

Upon determining that a connection parameter request message is received from the master 1010 (e.g., yes-branch at operation 1205), at operation 1207, the processor 320 may transmit the master 1010 a connection parameter response message (e.g., LL_CONNECTION_PARAM_RSP) corresponding to the connection parameter request message by using the communication circuit (e.g., communication circuit 390 in FIG. 3). In one embodiment, upon receiving a connection parameter request from the master 1010, the processor 320 may provide the master 1010 with a response to apply the values of the connection interval and slave latency changed by the master 1010 according to the connection parameter request message. In another embodiment, when the processor 320 rejects the change of the connection parameters according to the connection parameter request message, the processor 320 may transmit a rejection message (e.g., LL_REJECT_IND or LL_REJECT_EXT_IND) other than a connection parameter response message to the master 1010, in which case the corresponding process may be terminated without transmission of a connection update indication message by the master 1010.

At operation 1209, the processor 320 may receive a connection update indication message (e.g., LL_CONNECTION_UPDATE_IND) from the master 1010 by using the communication circuit. In one embodiment, the connection update indication message may include an instant value specified based on the delta calculated by the master 1010.

When the instant is reached, at operation 1211, the processor 320 may update the connection parameters. In one embodiment, the processor 320 may monitor the designated instant according to the instant time point included in the connection update indication message, and may update the connection parameters including the connection interval and the slave latency when the corresponding instant is reached. The connection parameters may include various parameters related to the connection, such as the connection interval, slave latency, and/or timeout. In various embodiments, the connection parameter request procedure (or connection parameter negotiation process) may include changing one or more connection parameters, and may update various connection parameters including the connection interval and slave latency. For example, the master 1010 may change the connection interval only or may simultaneously change a combination of one or more connection parameters such as the connection interval, the slave latency, and the timeout by use of the connection parameter request procedure.

Figure 13:
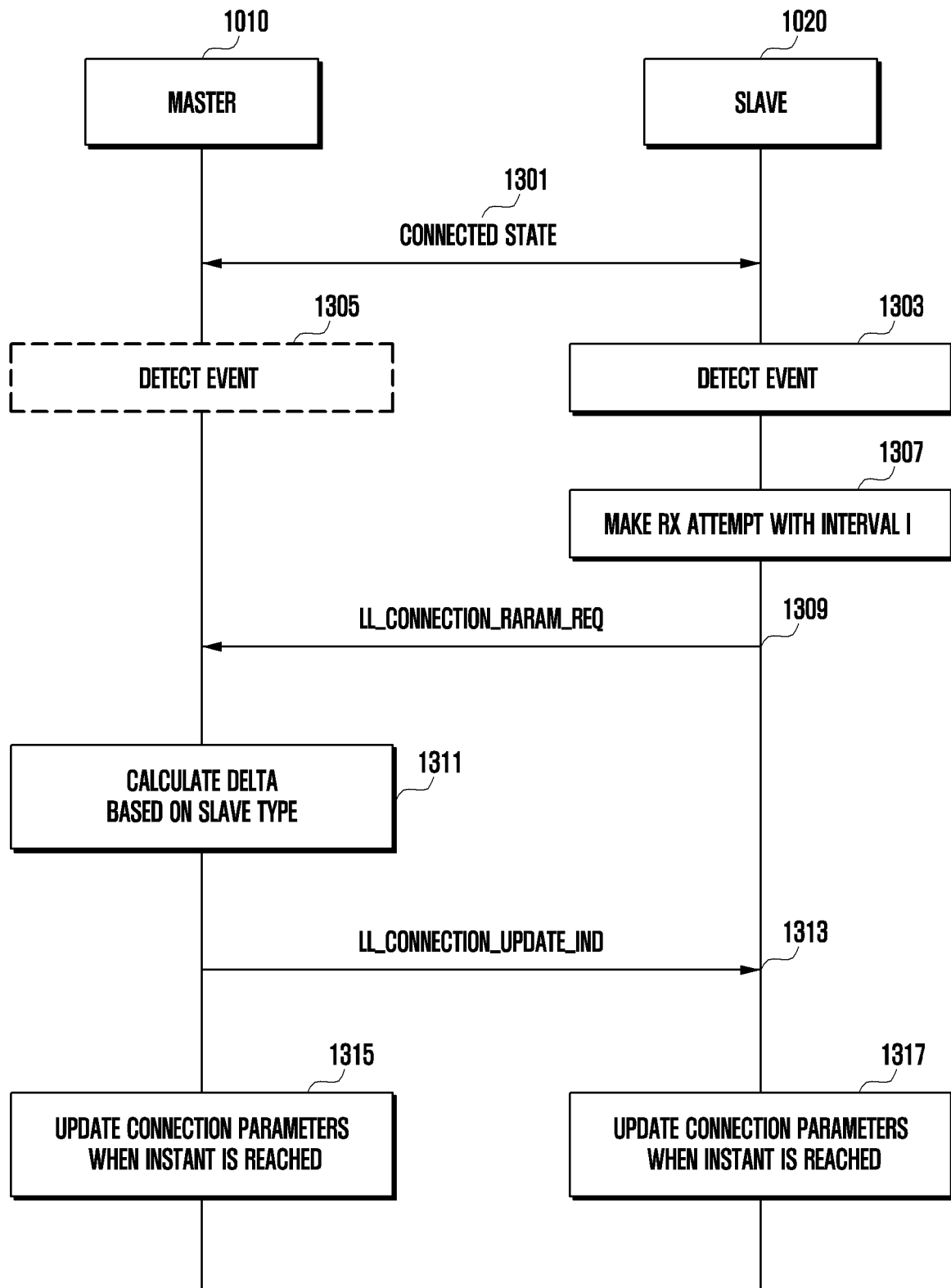
FIG. 13 is a sequence diagram illustrating an adaptive connection update process initiated by a slave according to an embodiment of the disclosure.

FIG. 13 is a sequence diagram illustrating an adaptive connection update process initiated by a slave according to an embodiment of the disclosure.

The embodiment of FIG. 13 illustrates a case where the slave 1020 (e.g., digital pen 201 in FIG. 2 or 3) transmits a connection parameter request message (e.g., LL_CONNECTION_PARAM_REQ) to the master 1010 (e.g., electronic device 101 in FIG. 1 or 2). In other words, FIG. 10 illustrates an example of performing an adaptive connection update initiated by the slave 1020.

Referring to FIG. 13, at operation 1301, the master 1010 and the slave 1020 may be in the connected state. For example, the master 1010 and the slave 1020 may be connected via BLE communication and remain in a standby state.

At operation 1303 or operation 1305, the slave 1020 or the master 1010 may detect a predefined event (or, designated event). In various embodiments, when the slave 1020 transmits a connection parameter request message, the master 1010 may be not required to detect a predefined event. For example, in the embodiment of FIG. 13, the master 1010 may skip operation 1305. In one embodiment, a predefined event may occur when the slave 1020 is separated from the master 1010. In one embodiment, a predefined event may occur when a designated application (e.g., application related to execution of a specific function using the slave 1020 (e.g., drawing function or mouse function)) is executed in the master 1010. In one embodiment, a predefined event may occur when a specific operation (e.g., function based on the button of the slave 1010) is executed (or detected) in the slave 1020.

In one embodiment, the event can be detected by either the master 1010 or the slave 1020. In another embodiment, the event may be detected almost simultaneously by both the master 1010 and the slave 1020. When the event is detected by both the master 1010 and the slave 1020 almost at the same time, the event may be processed based on at least the following operations. For example, if the connection parameter request procedure has already started due to the time difference in detecting the event between the master 1010 and the slave 1020, both the master 1010 and the slave 1020 may not transmit an additional connection parameter request until the corresponding procedure is completed. As another example, if the master 1010 or the slave 1020 receives a connection parameter request message after the connection parameter request procedure has started, the connection may be released. For example, if the master 1010 receives a connection parameter request message, the master 1010 may reject (or release) the connection by transmitting a connection rejection message (e.g., LL_REJECT_IND or LL_REJECT_EXT_IND). For example, if the slave 1020 receives a connection parameter request message, the slave 1020 may terminate the existing slave-initiated procedure (e.g., slave-initiated connection parameter request procedure for connection parameter negotiation), and may restart the connection parameter negotiation based on the master-initiated procedure (e.g., master-initiated connection parameters request procedure for connection parameter negotiation).

At operation 1307, the slave 1020 may make a reception (Rx) attempt based on the interval of a designated value (e.g., interval i). For example, upon detection of the event, the slave 1020 may make a reception attempt based on an interval value within the slave latency predefined between the master 1010 and the slave 1020. In one embodiment, the slave 1020 may open (or make an attempt) the reception (Rx) based on the slave latency. In one embodiment, if an event is detected at operation 1303, the slave 1020 may open (or make an attempt) the reception (Rx) based on a designated interval value (e.g., interval i) being a period shorter than the slave latency (e.g., interval less than or equal to the slave latency) in response to the event detection. In one embodiment, the slave 1020 may improve the update speed in comparison to the power consumed for reception by making a reception attempt based on the designated interval value only when the corresponding event occurs. In one embodiment, the slave 1020 may make a reception (Rx) attempt with an interval less than or equal to the slave latency to reduce power consumption in normal situations. In one embodiment, when a designated event is detected, the slave 1020 may make a reception attempt with an interval i to improve the update speed by using the interval i less than or equal to the slave latency instead of the slave latency. In one embodiment, the interval i may include a value of 0 or more (e.g., i≥0).

At operation 1309, the slave 1020 may include desired change values for the connection parameters (e.g., connection interval and slave latency) in a connection parameter request message (e.g., LL_CONNECTION_PARAM_REQ) and transmit the message to the master 1010. In the embodiment of FIG. 13, operation 1307 and operation 1309 may be performed in sequence, in parallel, or in reverse sequence.

At operation 1311, the master 1010 may calculate the delta based on the type of the slave. In one embodiment, upon receiving a connection parameter request message from the slave 1020, the master 1010 may identify the target slave 1020 that has transmitted the connection parameter request message based on the received connection parameter request message. In one embodiment, the master 1010 may identify the type of the slave 1020 based on the identification information (e.g., device ID) of the slave 1020 obtained from the values carried in an advertising packet received during an advertising operation before the connection is made with the slave 1020. For example, the master 1010 can identify whether the slave 1020 having transmitted the connection parameter request message is a designated (or pre-agreed) slave capable of supporting an adaptive connection update of various embodiments.

In one embodiment, the master 1010 may identify the device attribute (e.g., mobile phone, pen, or earphone) of the slave 1020 based on identification information of the slave 1020. In one embodiment, the master 1010 and the slave 1020 may know each other's device attribute at the time of making the connection, and the identification information of the slave 1020 may be managed (or stored) in a lookup table for the device attribute. In various embodiments, the operation of identifying the slave 1020 may be an operation of checking the already known device attribute of the slave 1020. In one embodiment, during an advertising operation before the connection is made between the master 1010 and the slave 1020 (e.g., advertiser and scanner group operation), the advertiser may use a pre-agreed value (or, value different from that specified in the specification) for the PDU type in an advertising packet. The scanner can identify whether the advertiser performing an advertisement is an advertiser satisfying a specified condition. Thereafter, when transitioning to the connected state (e.g., connected as a master and a slave), the corresponding scanner may be changed into a master, and the corresponding advertiser may be changed into a slave. Then, the master can determine whether the slave satisfies the specified condition based on the device attribute of the slave.

In one embodiment, the master 1010 may selectively use the first designated scheme or the second designated scheme based on at least the status information of the master 1010 or slave 1020 or additional information of the event. For example, when the master 1010 is connected to the slave 1020 supporting the first designated scheme and the second designated scheme, the master 1010 may check the specified condition (e.g., status information of the master 1010 or slave 1020, or additional information of the event) and operate in a fast mode, or may preferentially use the first designated scheme if a specific event type is configured.

In one embodiment, if the slave 1020 is identified to be a designated slave, the master 1010 may calculate the delta, which is a time interval between a message related to the connection parameter update (e.g., connection parameter request message) and the instant, based on the first designated scheme (e.g., delta calculation using Equation 2) (e.g., FIG. 9B). In one embodiment, if the slave 1020 having transmitted the connection parameter request message is identified to be a non-designated slave, the master 1010 may calculate the delta, which is a time interval between a message related to the connection parameter update (e.g., connection parameter request message) and the instant, based on the second designated scheme (e.g., delta calculation using Equation 1) (e.g., FIG. 8B).

In another embodiment, when the master 1010 rejects the connection parameter request message from the slave 1020, the master 1010 may transmit a rejection message (e.g., LL_REJECT_IND or LL_REJECT_EXT_IND) without performing an operation for changing the connection parameters (e.g., calculating the delta and transmitting a connection update indication message), in which case the corresponding process may be terminated.

At operation 1313, the master 1010 may specify the instant based on the calculated delta and then transmit a connection update indication message (e.g., LL_CONNECTION_UPDATE_IND) including the specified instant value to the slave 1020. In one embodiment, the master 1010 may calculate the delta being a time interval between a message related to the connection parameter update and the instant, determine the time point of the instant according to the calculated delta, and transmit a connection update indication message including the determined instant time point to the slave 1020.

When the instant is reached, at operation 1315 (at operation 1317), the master 1010 (the slave 1020) may update the connection parameters. In one embodiment, the master 1010 and the slave 1020 may monitor the designated instant according to the instant time point included in the connection update indication message, and may update the connection parameters including the connection interval and/or the slave latency when the corresponding instant is reached. The connection parameters may include various parameters related to the connection, such as the connection interval, slave latency, and/or timeout. In one embodiment, the timeout may be a criterion for determining release (or disconnection) of the connection when there is no response between the master 1010 and the slave 1020. In various embodiments, the connection parameter request procedure (or connection parameter negotiation process) may include changing one or more connection parameters, and may update various connection parameters including the connection interval and slave latency. For example, the master 1010 may change the connection interval only or may simultaneously change a combination of one or more connection parameters such as the connection interval, the slave latency, and the timeout by use of the connection parameter request procedure.

Although not shown in FIG. 13, the embodiment of FIG. 13 can be applied to the embodiment of FIG. 7. For example, after operation 1307 in FIG. 13, for the slave 1020 to request, at the host layer, the master 1010 to transmit a connection parameter request message (e.g., LL_CONNECTION_PARAM_REQ) indirectly through a L2CAP signaling channel, the slave 1020 may transmit, at the L2CAP layer, an L2CAP connection parameter update request message (L2CAP_CONNECTION_PARAM_UPDATE_REQ) to the master 1010. In one embodiment, upon receiving the connection parameter update request message from the slave 1020, the master 1010 may transmit a connection parameter update response message (e.g., L2CAP_CONNECTION_PARAM_UPDATE_RSP) to the slave 1020. Thereafter, the slave 1020 may receive a connection parameter request message from the master 1010, and may transmit a connection parameter response message to the master 1010 in response to the connection parameter request message.

Figure 14:
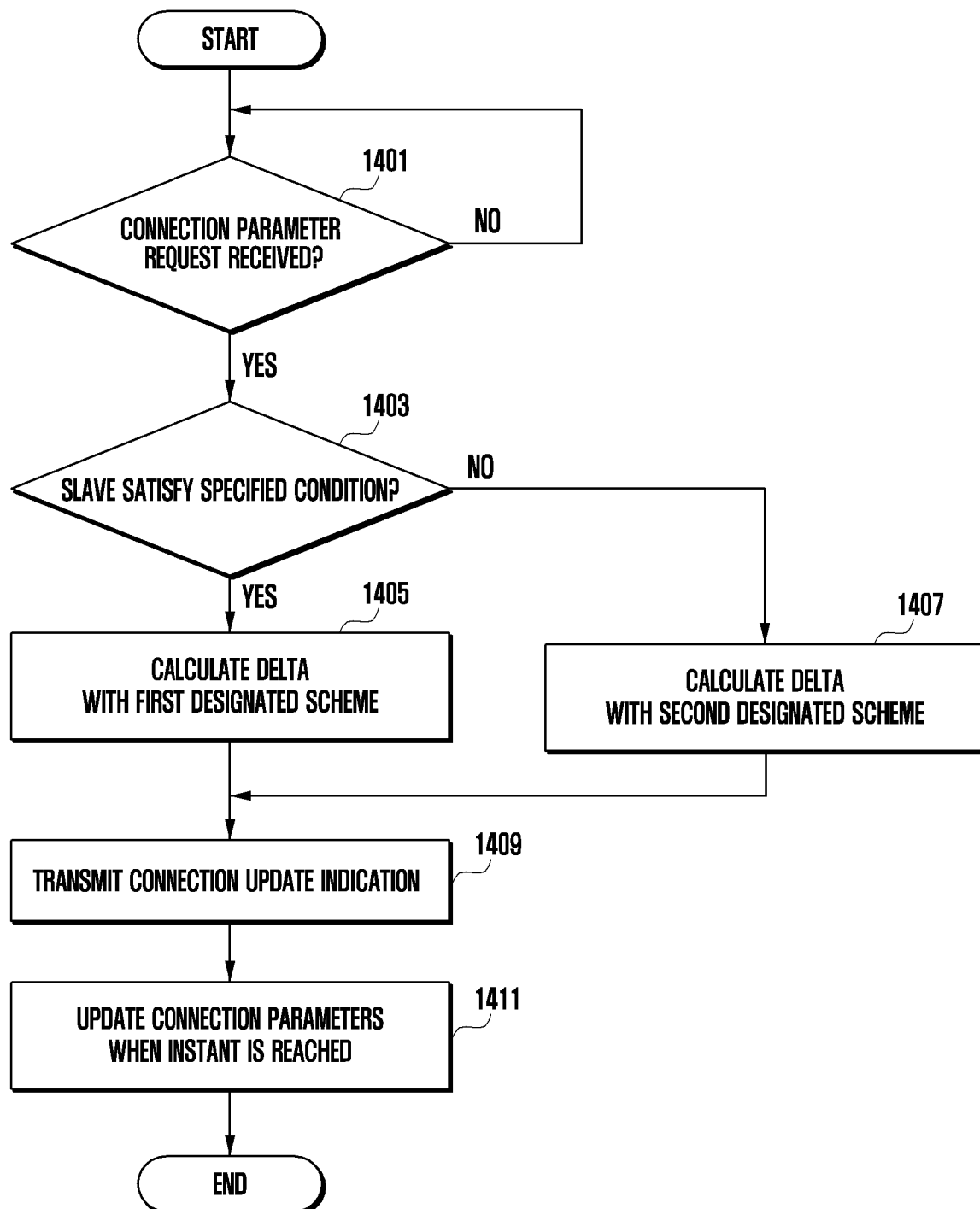
FIG. 14 is a flowchart illustrating an adaptive connection update method of a master according to an embodiment of the disclosure.

FIG. 14 is a flowchart illustrating an adaptive connection update method of a master according to an embodiment of the disclosure.

The embodiment of FIG. 14 illustrates operations of the master 1010 (e.g., electronic device 101 in FIG. 1 or 2) when the slave 1020 (e.g., digital pen 201 in FIG. 2 or 3) transmits a connection parameter request message to the master 1010. The operations of the master 1010 according to the embodiment of FIG. 14 may be executed by at least one processor (e.g., processor 120 in FIG. 1) of the electronic device 101 of FIG. 1 (e.g., at least one processor including processing circuits). In one embodiment, the operations of the master 1010 may be implemented as instructions that are stored in the memory (e.g., memory 130 in FIG. 1) of the electronic device 101 and cause, when executed, the processor 120 to operate.

Referring to FIG. 14, at operation 1401, the processor (e.g., processor 120) of the master 1010 may determine whether a connection parameter request message (e.g., LL_CONNECTION_PARAM_REQ) is received from the slave 1020. In one embodiment, the processor 120 may receive, through a communication circuit (e.g., wireless communication module 192 in FIG. 1), a connection parameter request message including desired change values for the connection interval and slave latency from the slave 1020 connected via BLE communication.

Upon determining that a connection parameter request message is not received from the slave 1020 (e.g., no-branch at operation 1401), the procedure may return to operation 1401. In one embodiment, even if a connection parameter request message is received from the slave 1020, the processor 120 may transmit a rejection message (e.g., LL_REJECT_IND or LL_REJECT_EXT_IND) to the slave 1020 when it rejects the change of the connection parameters according to the connection parameter request message, in which case the corresponding process may be terminated.

At operation 1403, the processor 120 may determine whether the slave 1020 is a slave satisfying a specified condition. In one embodiment, the processor 120 can identify whether the slave 1020 having transmitted the connection parameter request message is a designated (or pre-agreed) slave capable of supporting an adaptive connection update of various embodiments. When a connection parameter request message is received from the slave 1020 (e.g., yes-branch at operation 1401), the processor 120 may identify the target slave 1020 that has transmitted the connection parameter request message based on the received connection parameter request message at operation 1403. In one embodiment, the processor 120 (e.g., master 1010) may identify the type of the slave 1020 based on the identification information (e.g., device ID) of the slave 1020 obtained from the values carried in an advertising packet received during an advertising operation before the connection is made with the slave 1020. In one embodiment, the processor 120 may identify the device attribute (e.g., mobile phone, pen, or earphone) of the slave 1020 based on identification information of the slave 1020. In one embodiment, the master 1010 and the slave 1020 may know each other's device attribute at the time of making the connection, and the identification information of the slave 1020 may be managed (or stored) in a lookup table for the device attribute. In various embodiments, the operation of identifying the slave 1020 may be an operation of checking the already known device attribute of the slave 1020. In one embodiment, during an advertising operation before the connection is made between the master 1010 and the slave 1020 (e.g., advertiser and scanner group operation), the advertiser may use a pre-agreed value (or, value different from that specified in the specification) for the PDU type in an advertising packet. The scanner can identify whether the advertiser performing an advertisement is an advertiser satisfying a specified condition. Thereafter, when transitioning to the connected state (e.g., connected as a master and a slave), the corresponding scanner may be changed into a master, and the corresponding advertiser may be changed into a slave. Then, the master can determine whether the slave satisfies the specified condition based on the device attribute of the slave.

In various embodiments, execution of operation 1403 for determination may be skipped. In one embodiment, the processor 120 (e.g., master 1010) may proceed from operation 1401 directly to operation 1405 without checking the condition of the slave 1020, and perform operation 1405 and subsequent operations based on, for example, a user need for rapid connection.

In various embodiments, the processor 120 may selectively use the first designated scheme or the second designated scheme based on at least the status information of the master 1010 or slave 1020 or additional information of the event. For example, when the master 1010 is connected to the slave 1020 supporting the first designated scheme and the second designated scheme, the processor 120 may check the specified condition (e.g., status information of the master 1010 or slave 1020, or additional information of the event) and operate in a fast mode, or may preferentially use the first designated scheme if a specific event type is configured.

Upon determining that the slave 1020 is a slave satisfying the specified condition (e.g., yes-branch at operation 1403), at operation 1405, the processor 120 may calculate the delta, which is a time interval between a message related to the connection parameter update (e.g., connection parameter request message) and the instant, based on the first designated scheme. In one embodiment, the first designated scheme may correspond to delta calculation using Equation 2.

Upon determining that the slave 1020 is not a slave satisfying the specified condition (e.g., no-branch at operation 1403), at operation 1407, the processor 120 may calculate the delta, which is a time interval between a message related to the connection parameter update (e.g., connection parameter request message) and the instant, based on the second designated scheme. In one embodiment, the second designated scheme may correspond to delta calculation using Equation 1.

At operation 1409, the processor 120 may specify the instant based on the calculated delta and then transmit a connection update indication message including the specified instant value to the slave 1020 through the communication circuit.

When the instant is reached, at operation 1411, the processor 120 may update the connection parameters. In one embodiment, the processor 120 may monitor the designated instant according to the instant time point included in the connection update indication message, and may update the connection parameters including the connection interval and/or the slave latency when the corresponding instant is reached. In one embodiment, the connection parameters may include various parameters related to the connection, such as the connection interval, slave latency, and/or timeout. In one embodiment, the timeout may be a criterion for determining release (or disconnection) of the connection when there is no response between the master 1010 and the slave 1020. In various embodiments, the connection parameter request procedure (or connection parameter negotiation process) may include changing one or more connection parameters, and may update various connection parameters including the connection interval and slave latency. For example, the master 1010 may change the connection interval only or may simultaneously change a combination of one or more connection parameters such as the connection interval, the slave latency, and the timeout by use of the connection parameter request procedure.

Figure 15:
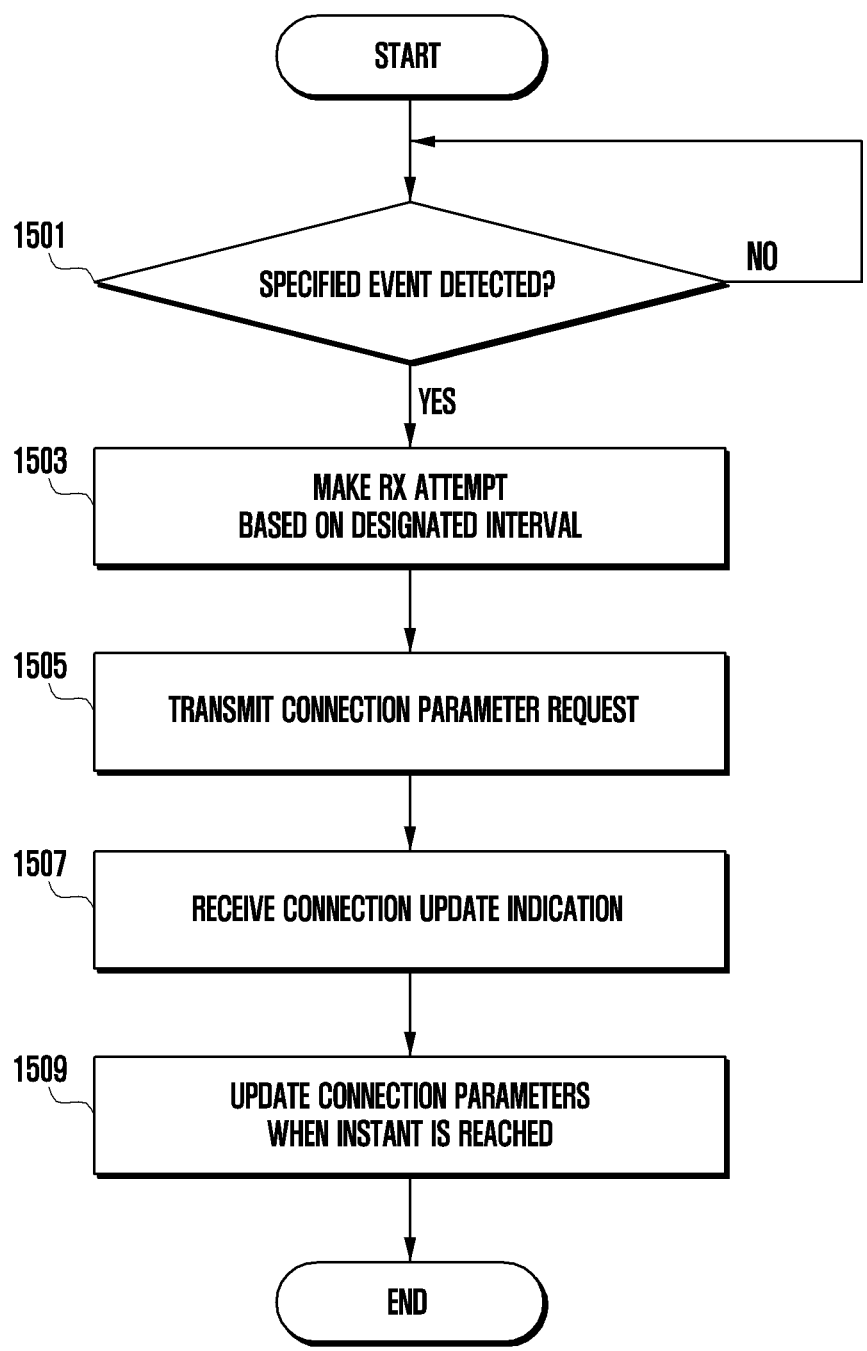
FIG. 15 is a flowchart illustrating an adaptive connection update method of a slave according to an embodiment of the disclosure.

FIG. 15 is a flowchart illustrating an adaptive connection update method of a slave according to an embodiment of the disclosure.

The embodiment of FIG. 15 illustrates operations of the slave 1020 (e.g., digital pen 201 in FIG. 2 or 3) when the slave 1020 transmits a connection parameter request message to the master 1010 (e.g., electronic device 101 in FIG. 1 or 2). The operations of the slave 1020 according to the embodiment of FIG. 15 may be executed by at least one processor (e.g., processor 320) of, for example, the digital pen 201 of FIG. 3 (e.g., at least one processor including processing circuits). In one embodiment, the operations of the slave 1020 may be implemented as instructions that are stored in the memory (e.g., memory 330 in FIG. 1) of the digital pen 201 and cause, when executed, the processor 320 to operate.

Referring to FIG. 15, at operation 1501, the processor (e.g., processor 320) of the slave 1020 may detect a predefined event. In one embodiment, the processor 320 may monitor a designated event related to execution of a designated function of the slave 1020 while the master 1010 and the slave 1020 are connected to each other. In one embodiment, predefined (or designated) events may include an event associated with separation of the slave 1020 from the master 1010, an event associated with execution of a designated application (e.g., application related to execution of a specific function using the slave 1020 (e.g., drawing function or mouse function)) in the master 1010, or an event associated with execution (or detection) of a specific operation (e.g., function based on the button of the slave 1010) in the slave 1020.

When a predefined event is not detected at operation 1501 (e.g., no-branch at operation 1501), the processor 320 may wait for detection of a predefined event at operation 1501.

When a predefined event is detected at operation 1501 (e.g., yes-branch at operation 1501), at operation 1503, the processor 320 may make a reception (Rx) attempt based on the interval of a designated value (e.g., interval i). For example, upon detection of the event, the processor 320 may make a reception (Rx) attempt based on an interval value within the slave latency predefined between the master 1010 and the slave 1020. In one embodiment, the processor 320 may open (or make an attempt) the reception (Rx) based on the slave latency. In one embodiment, if a designated event is detected at operation 1501, the processor 320 may make a reception (Rx) attempt based on a designated interval value (e.g., interval i) being a period shorter than the slave latency (e.g., interval less than or equal to the slave latency) in response to the event detection. In one embodiment, the processor 320 may improve the update speed by making a reception attempt based on the designated interval value only when the corresponding event occurs. In one embodiment, the processor 320 (e.g., slave 1020) may make a reception (Rx) attempt with an interval less than or equal to the slave latency to reduce power consumption in normal situations. In one embodiment, when a designated event is detected, the processor 320 may make a reception attempt with an interval i to improve the update speed by using the interval i less than or equal to the slave latency instead of the slave latency. In one embodiment, the interval i may include a value of 0 or more (e.g., i≥0).

At operation 1505, the processor 320 may transmit the master 1010 a connection parameter request message (e.g., LL_CONNECTION_PARAM_REQ) including desired change values for the connection interval and slave latency by using the communication circuit (e.g., communication circuit 390 in FIG. 3). In the embodiment of FIG. 15, operation 1503 and operation 1505 may be performed in sequence, in parallel, or in reverse sequence.

At operation 1507, the processor 320 may receive a connection update indication message from the master 1010 by using the communication circuit. In one embodiment, the connection update indication message may include an instant value specified based on the delta calculated by the master 1010.

When the instant is reached, at operation 1509, the processor 320 may update the connection parameters. In one embodiment, the processor 320 may monitor the designated instant according to the instant time point included in the connection update indication message, and may update the connection parameters including the connection interval and the slave latency when the corresponding instant is reached. The connection parameters may include various parameters related to the connection, such as the connection interval, slave latency, and/or timeout. In various embodiments, the connection parameter request procedure (or connection parameter negotiation process) may include changing one or more connection parameters, and may update various connection parameters including the connection interval and slave latency. For example, the master 1010 may change the connection interval only or may simultaneously change a combination of one or more connection parameters such as the connection interval, the slave latency, and the timeout by use of the connection parameter request procedure.

FIGS. 16A, 16B, 17A, and 17B are diagrams depicting operation scenarios according to various embodiments of the disclosure.

In the embodiments of FIGS. 16A to 17B, the master 1010 may be an electronic device 101 (e.g., smartphone), and the slave 1020 may be a digital pen 201 that can be mounted on the electronic device 101. In one embodiment, the slave 1020 may be a device with a low power capacity like the digital pen 201.

Figure 16A:
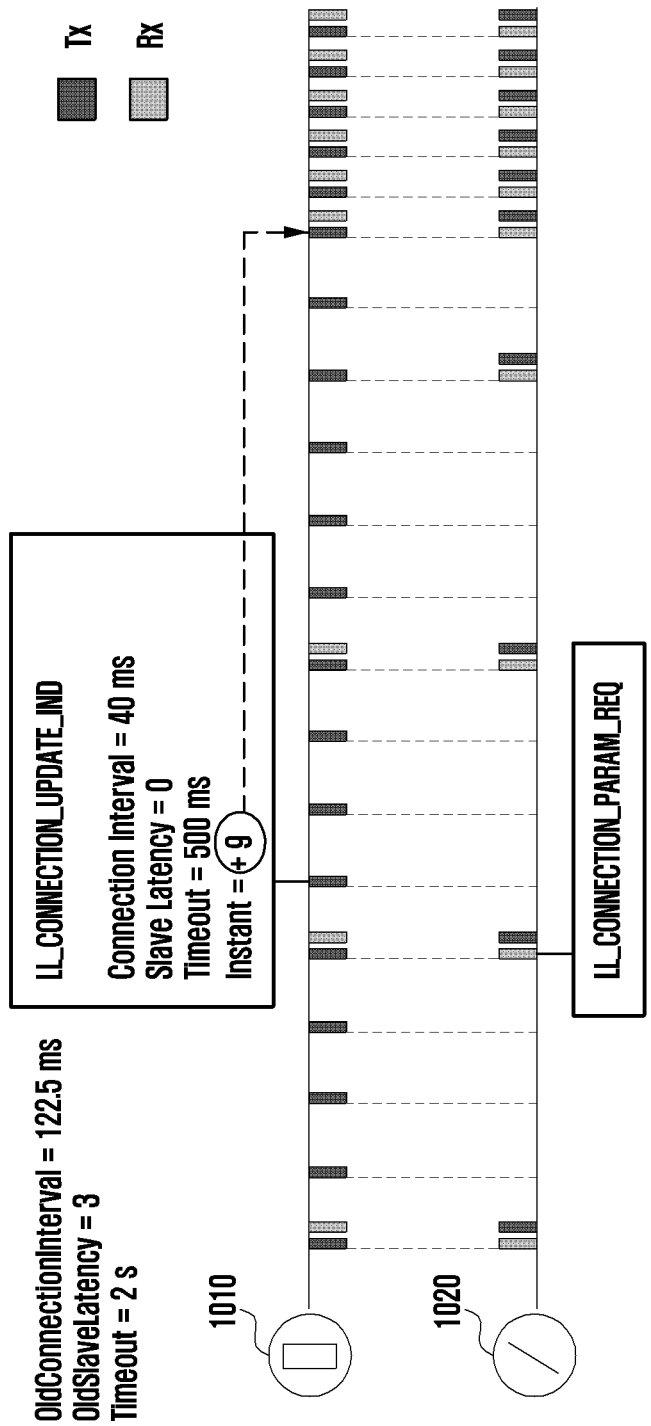
FIGS. 16A and 16B are diagrams depicting an operation scenario according to various embodiments of the disclosure.
Figure 16B:
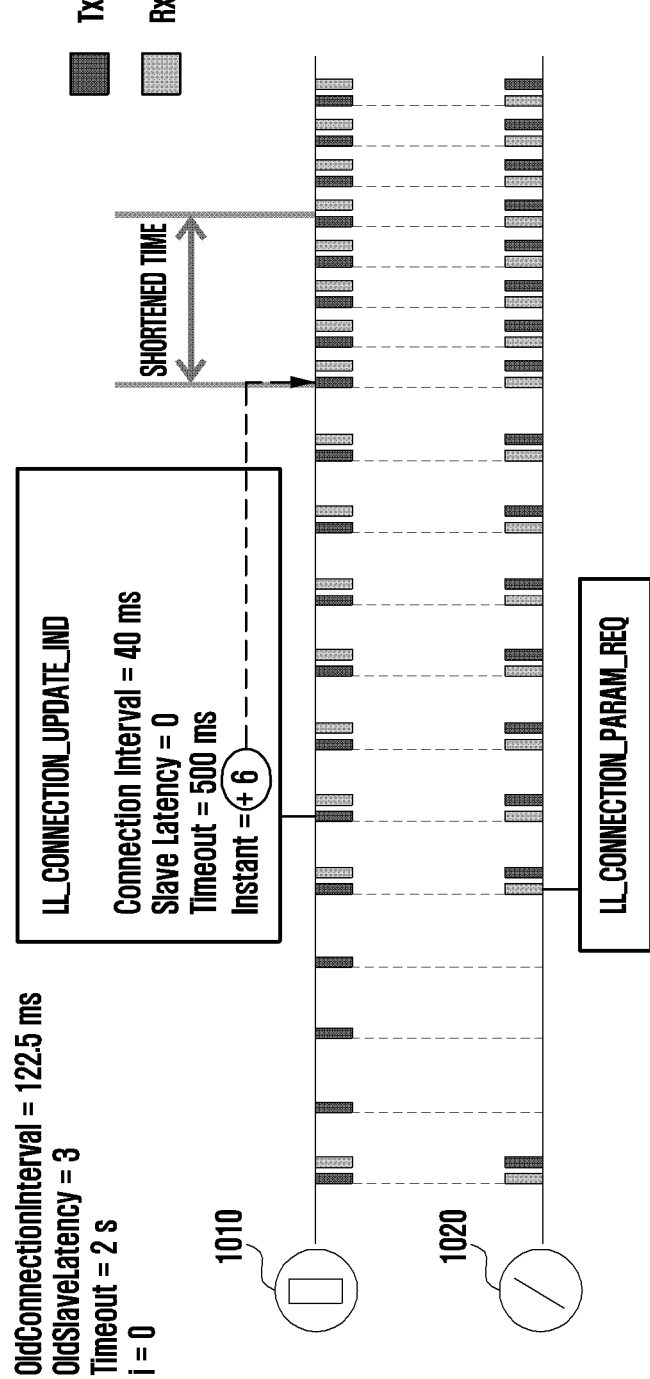

The embodiment of FIG. 16A or 16B may illustrate a case where the slave 1020 initiates a connection parameter negotiation process (e.g., connection parameter update procedure). For example, in FIGS. 16A and 16B, the slave 1020 may transmit a connection parameter request message. The embodiment of FIG. 17A or 17B may illustrate a case where the master 1010 initiates a connection parameter negotiation process (e.g., connection parameter update procedure). For example, in FIGS. 17A and 17B, the master 1010 may transmit a connection parameter request message.

In one embodiment, while the slave 1020 (e.g., digital pen 201) is inserted into the master 1010 (e.g., the electronic device 101), it may use relatively large values for the connection interval and slave latency to reduce power consumption for maintaining the BLE connection. In one embodiment, when the slave 1020 is detached or separated from the master 1010, the slave 1020 may change the values of the connection parameters including the connection interval and slave latency to the smallest possible values to immediately transfer a user input to the master 1010. To change the value of the connection parameters, the master 1010 and the slave 1020 may perform a connection parameter negotiation process as described above.

Referring to FIGS. 16A to 17B, when the existing values of the slave latency (e.g., OldSlaveLatency) and the connection interval (e.g., OldConnectionInterval) are large, it may take a relatively long time for the instant to arrive. In this case, the first input of the user occurring immediately after the detachment of the digital pen 201 may be delayed and transferred to the electronic device 101.

The embodiments shown in FIGS. 16A to 17B shows the difference between when the second designated scheme (e.g., Equation 1) is used (e.g., FIGS. 16A and 17A) and when the first designated scheme (e.g., Equation 2) is used (e.g., FIGS. 16B and 17B) in using connection parameter values to perform the connection parameter negotiation process between the master 1010 and the slave 1020. For example, the timing diagrams according to the embodiments of FIGS. 16A and 17A indicate a case where the proposed scheme is not applied (e.g., second designated scheme based on Equation 1 is applied), and the timing diagrams according to the embodiments of FIGS. 16B and 17B indicate a case where the adaptive connection update method is applied (e.g., first designated scheme based on Equation 2 is applied).

In one embodiment, the master 1010 and the slave 1020 may be connected via BLE in FIGS. 16A to 17B. In one embodiment, FIGS. 16A and 16B may indicate a case where, when the slave 1020 is detached from the master 1010, the slave 1020 transmits a connection parameter request message (e.g., LL_CONNECTION_PARAM_REQ) to the master 1010. In one embodiment, FIGS. 17A and 17B may indicate a case where, when the slave 1020 is detached from the master 1010, the master 1010 transmits a connection parameter request message (e.g., LL_CONNECTION_PARAM_REQ) to the slave 1020.

In the embodiments of FIGS. 16A to 17B, it is assumed that the existing value of the connection interval (e.g., OldConnectionInterval) is about '122.5 ms', the existing value of the slave latency (e.g., OldSlaveLatency) is about 3, the existing value of the timeout is about 2 s, and the value of the interval (e.g., interval i) is 0. In one embodiment, the timeout may be a criterion for determining release (or disconnection) of the connection when there is no response between the master 1010 and the slave 1020.

In one embodiment, when the value of the slave latency is 3, the slave 1020 may make a reception (Rx) attempt every four connection events. In one embodiment, if the slave 1020 (e.g., digital pen 201) is detached from the master 1010 (e.g., electronic device 101) between the first connection event and the fourth connection event, the slave 1020 recognizing this may transmit a connection parameter request message (e.g., LL_CONNECTION_PARAM_REQ) to the master 1010 during the fifth connection event.

Figure 17A:
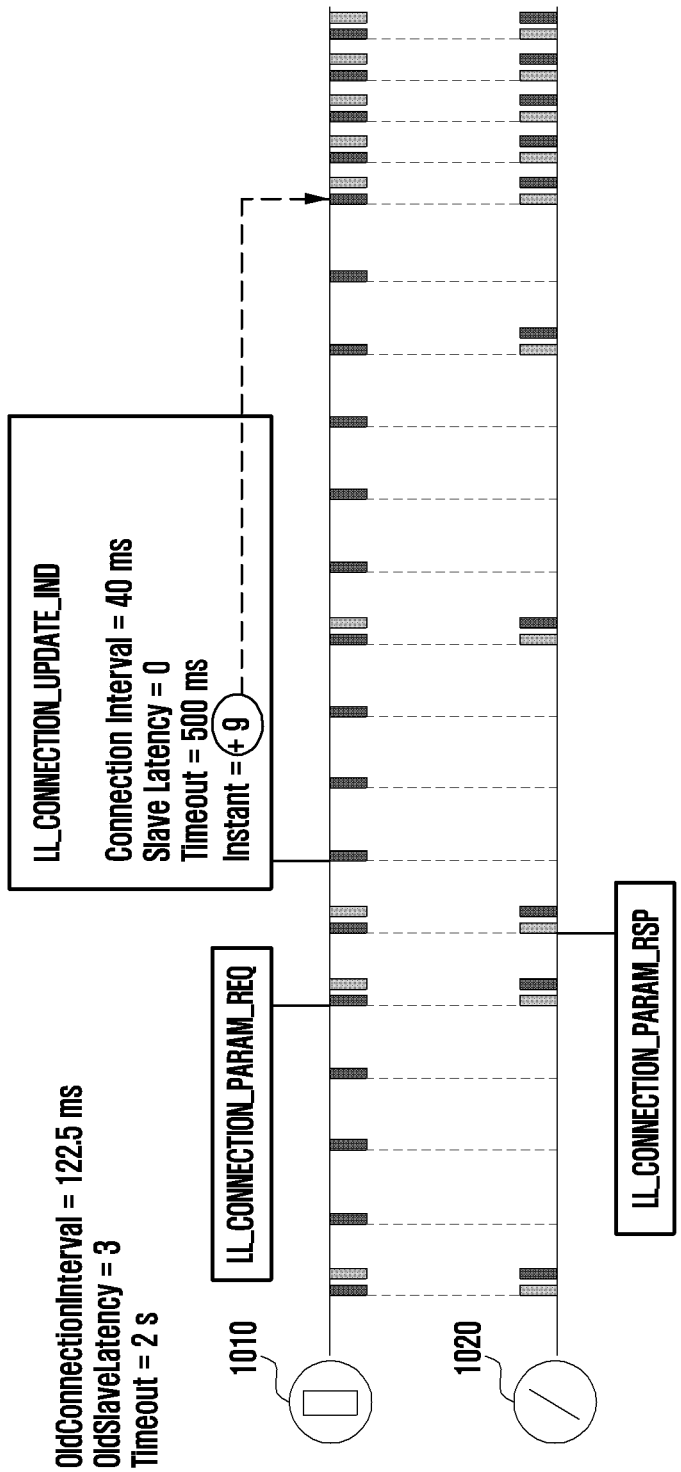
FIGS. 17A and 17B are diagrams depicting an operation scenario according to various embodiments of the disclosure.
Figure 17B:
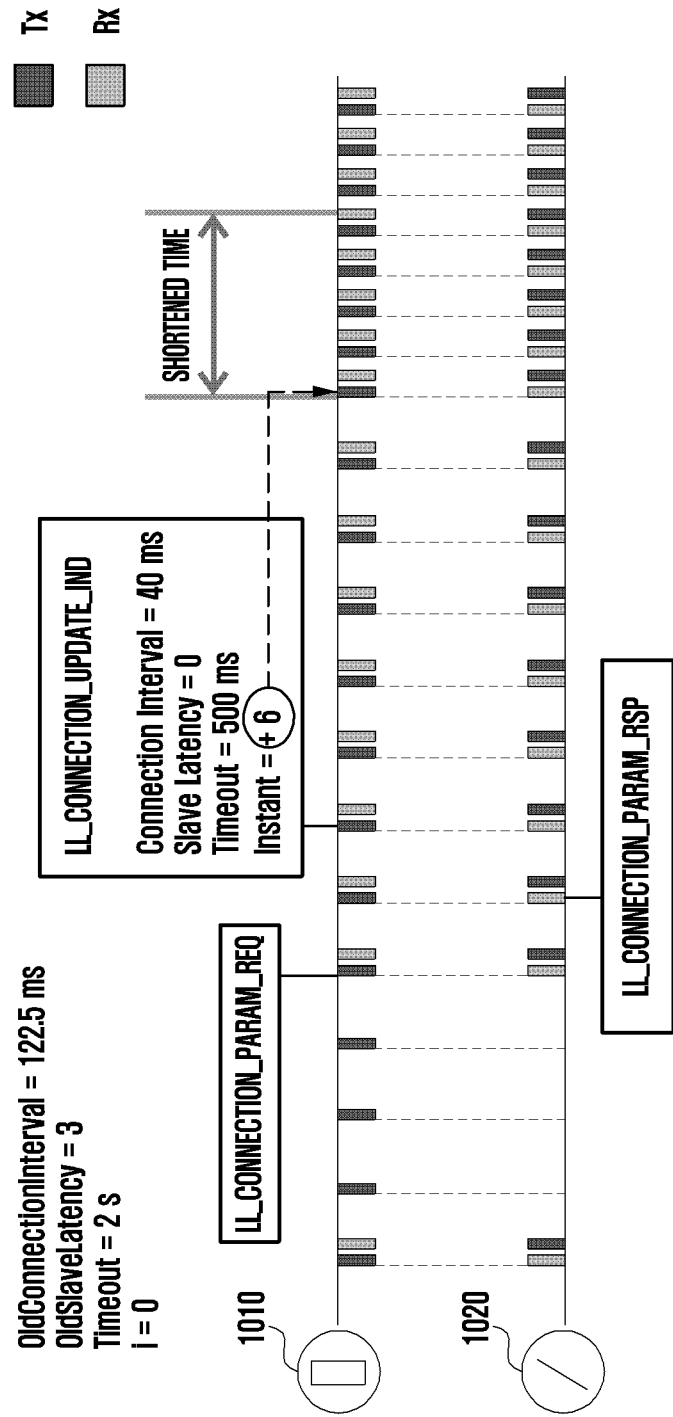

In one embodiment, it is assumed that that the connection parameters to be changed include the connection interval, the slave latency, and/or the timeout, and it is also assumed that the new value of the connection interval is about 40 ms (e.g., about 122.5 ms-> about 40 ms), the new value of the slave latency is about 0 (e.g., about 3-> about 0), and the new value of the timeout is about 500 ms (e.g., about 2 s-> about 500 ms). In various embodiments, when the adaptive connection update method is applied (e.g., first designated scheme based on Equation 2), as shown in FIG. 16B or 17B, the interval i of the slave 1020 (e.g., digital pen 201) is 0, and the slave 1020 makes a reception (Rx) attempt every connection event immediately after transmitting a connection parameter request message (e.g., FIG. 16B) or a connection parameter response message (e.g., FIG. 17B).

In the embodiments of FIGS. 16A to 17B, it may be assumed that the master 1010 transmits a connection update indication message immediately after the slave 1020 transmits a connection parameter request message (e.g., FIGS. 16A and 16B) or a connection parameter response message (e.g., FIGS. 17A and 17B), and the x values used are 0 and 6, respectively. In the illustrated embodiments, the values of the instant are 9 and 6, respectively, and there is a difference of three connection events between when the adaptive connection update of the disclosure is not applied (e.g., FIG. 16A or 17A) and when the adaptive connection update of the disclosure is applied (e.g., FIG. 16B or 17B), which may mean that there is a time difference of about 367.5 ms for instant occurrences. In one embodiment, the master 1010 and the slave 1020 may process a connection event after waiting for a time excluding the time corresponding to the existing slave latency. For example, the master 1010 and the slave 1020 may make a fast connection based on the reduced time until the instant time point after waiting for the slave latency.

In one embodiment, when the designated event ends, the connection parameter update procedure may be performed again. For example, upon detecting insertion (or attachment) of the slave 1020 into the master 1010, or upon detecting termination of an application in the master 1010 in relation to a specific function (e.g., designated function using the slave 1020), or upon detecting termination of a specific operation (e.g., drawing function or mouse function) in the slave 1020, the connection parameter update procedure may be newly performed.

In one embodiment, if a specific operation (e.g., drawing function or mouse function) is not used for a preset time or longer in the slave 1020, the slave 1020 or the master 1010 may perform the connection parameter update procedure again. For example, the values of the connection interval, slave latency, and/or timeout may be changed to the existing values (e.g., initial values).

According to various embodiments of the disclosure, an operation method of the electronic device 101 may include: receiving a first designated message associated with a connection parameter update through a communication circuit from an external electronic device connected via the Bluetooth low energy (BLE) protocol; determining, in response to the reception of the first designated message, a designated scheme for the connection parameter update based on the attribute of the external electronic device; determining the time point of the instant based on the determined designated scheme; transmitting a second designated message including the instant time point to the external electronic device; and making an update to the connection parameters when the time point of the instant is reached.

In various embodiments, the first designated message may include a connection parameter request message, a connection parameter response message, or a connection update request message, and the second designated message may include a connection update indication message including the determined instant time point.

In various embodiments, determining the time point of the instant may include determining, when the attribute of the external electronic device supports the adaptive connection update, the instant time point based on a first designated scheme; and determining, when the attribute of the external electronic device does not support the adaptive connection update, the instant time point based on a second designated scheme.

In various embodiments, the operation method may include: initiating, by the external electronic device (e.g., electronic device 201), an operation related to the connection update based on the transmission of the first designated message to the electronic device; opening, by the external electronic device, the reception (Rx) based on the old connection interval and a specified interval value less than or equal to the old slave latency according to the initiation of the operation related to the connection update; receiving, by the external electronic device, the second designated message including the instant time point determined by the electronic device from the electronic device; and updating, by the external electronic device, the connection parameters when the time point of the instant is reached.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuit configured to perform wireless communication;
   at least one processor operatively connected to the communication circuit; and
   a memory operatively connected to the at least one processor,
   wherein the memory is configured to store instructions that, when executed, cause the at least one processor to:
      receive a first designated message associated with a connection parameter update through the communication circuit from an external electronic device connected via a Bluetooth low energy (BLE) protocol, determine, in response to reception of the first designated message, a designated scheme for the connection parameter update based on an attribute of the external electronic device, determine a time point of an instant based on the determined designated scheme, transmit a second designated message comprising the determined instant time point to the external electronic device, and make an update to connection parameters when the time point of the instant is reached, and wherein the determination of the instant time point comprises determining a time interval between the first designated message and the time point of the instant.

2. The electronic device of claim 1, wherein the first designated message comprises a connection parameter request message, and wherein the stored instructions, when executed, further cause the at least one processor to determine the designated scheme based on reception of the connection parameter request message requesting a change of the connection parameters.

3. The electronic device of claim 1, wherein the first designated message comprises a connection parameter response message, and wherein the stored instructions, when executed, further cause the at least one processor to:

transmit a connection parameter request message requesting a change of the connection parameters to the external electronic device, receive the connection parameter response message accepting the change of the connection parameters as a response to the connection parameter request message from the external electronic device, and determine the designated scheme based on reception of the connection parameter response message.

4. The electronic device of claim 1, wherein the first designated message comprises a connection update request message, and wherein the stored instructions, when executed, further cause the at least one processor to:

receive the connection update request message from the external electronic device, transmit, in response to reception of the connection update request message, a connection update response message to the external electronic device, transmit a connection parameter request message requesting a change of the connection parameters to the external electronic device, receive a connection parameter response message as a response to the connection parameter request message from the external electronic device, and determine the designated scheme based on reception of the connection parameter response message.

5. The electronic device of claim 1, wherein the connection parameters comprise at least one of a connection interval, a slave latency, or a timeout.

6. The electronic device of claim 1, wherein the attribute of the external electronic device comprises an indication of whether an adaptive connection update is supported, and wherein the stored instructions, when executed, further cause the at least one processor to:

determine, in case that the attribute of the external electronic device supports the adaptive connection update, a first designated scheme to be the designated scheme for determining the instant time point, and determine, in case that the attribute of the external electronic device does not support the adaptive connection update, a second designated scheme to be the designated scheme for determining the instant time point.

7. The electronic device of claim 6, wherein the first designated scheme configures an interval for opening reception (Rx) of the external electronic device to be a period shorter than an old slave latency.

8. The electronic device of claim 6, wherein the second designated scheme configures an interval for opening reception (Rx) of the external electronic device based on an old slave latency and an old connection interval.

9. The electronic device of claim 6, wherein the stored instructions, when executed, further cause the at least one processor to:

change a value of a connection interval to a first designated value, and change a value of a slave latency to a second designated value, wherein the first designated value comprises a value different from an old value of the connection interval, and wherein the second designated value comprises a value different from the old value of the slave latency.

10. The electronic device of claim 9, wherein the stored instructions, when executed, further cause the at least one processor to process a connection event after waiting for a period of time excluding a time corresponding to the slave latency.

11. The electronic device of claim 1, wherein the second designated message comprises a connection update indication message including the determined instant time point.

12. The electronic device of claim 1, wherein the instructions, when executed, further cause the at least one processor to perform an operation related to the connection parameter update based on at least an event corresponding to detachment of the external electronic device from the electronic device, an event corresponding to execution of a specific application in the electronic device, or an event corresponding to execution of a specific operation in the external electronic device.

13. An electronic device comprising:

a communication circuit configured to perform wireless communication;

at least one processor operatively connected to the communication circuit; and a memory operatively connected to the at least one processor, wherein the memory stores instructions that, when executed, cause the at least one processor to:

initiate an operation related to a connection update through the communication circuit based on a designated event and an external electronic device connected via a Bluetooth low energy (BLE) protocol, open reception (Rx) based on a specified interval less than or equal to an old connection interval and an old slave latency according to initiation of the operation related to the connection update, receive, based on the operation related to the connection update, a message that comprises an instant time point determined by the external electronic device and indicates an update of connection parameters from the external electronic device, and make an update to the connection parameters when the instant time point is reached, and wherein the determination of the instant time point comprises determining a time interval between a first designated message and the instant time point.

14. The electronic device of claim 13, wherein the stored instructions, when executed, further cause the at least one processor to:

transmit, based on the designated event, a connection parameter request message requesting a change of the connection parameters to the external electronic device, and initiate, based on transmission of the connection parameter request message, the operation related to the connection update.

15. The electronic device of claim 13, wherein the stored instructions, when executed, further cause the at least one processor to:

receive a connection parameter request message requesting a change of the connection parameters from the external electronic device, transmit, in response to the connection parameter request message, a connection parameter response message accepting the change of the connection parameters to the external electronic device, and initiate, based on transmission of the connection parameter response message, the operation related to the connection update.

16. The electronic device of claim 13, wherein the stored instructions, when executed, further cause the at least one processor to:

transmit a connection update request message to the external electronic device, receive a connection update response message as a response to the connection update request message from the external electronic device, receive a connection parameter request message requesting a change of the connection parameters from the external electronic device, transmit, in response to the connection parameter request message, a connection parameter response message to the external electronic device, and initiate, based on transmission of the connection parameter response message, the operation related to the connection update.

17. An operation method of an electronic device, the method comprising:

receiving a first designated message associated with a connection parameter update through a communication circuit from an external electronic device connected via a Bluetooth low energy (BLE) protocol;

determining, in response to reception of the first designated message, a designated scheme for the connection parameter update based on an attribute of the external electronic device;

determining a time point of an instant based on the determined designated scheme;

transmitting a second designated message including the instant time point to the external electronic device; and making an update to connection parameters when the time point of the instant is reached, wherein the determination of the instant time point comprises determining a time interval between the first designated message and the time point of the instant.

18. The operation method of claim 17, wherein the first designated message comprises a connection parameter request message, a connection parameter response message, or a connection update request message, and wherein the second designated message comprises a connection update indication message including the determined instant time point.

19. The operation method of claim 17, wherein the determining of a time point of an instant comprises:

determining, in case that the attribute of the external electronic device supports an adaptive connection update, the instant time point based on a first designated scheme; and determining, in case that the attribute of the external electronic device does not support the adaptive connection update, the instant time point based on a second designated scheme.

20. The operation method of claim 17, further comprising:

initiating, by the external electronic device, an operation related to a connection update based on transmission of the first designated message to the electronic device;

opening, by the external electronic device, reception (Rx) based on a specified interval less than or equal to an old connection interval and an old slave latency according to initiation of the operation related to the connection update;

receiving, by the external electronic device, the second designated message including the instant time point determined by the electronic device from the electronic device; and updating, by the external electronic device, the connection parameters when the time point of the instant is reached.

21. The operation method of claim 17, wherein the connection parameter update is performed in response to a designated event, and wherein a second connection parameter update is performed when the designated event ends.

* * * * *